United States Patent
Delavaux et al.

(10) Patent No.: US 11,670,903 B2
(45) Date of Patent: Jun. 6, 2023

(54) BROADBAND HYBRID OPTICAL AMPLIFIER OPERATION IN EYE-SAFE WAVELENGTH REGION

(71) Applicant: Cybel, LLC., Bethlehem, PA (US)

(72) Inventors: Jean-Marc Delavaux, Pittstown, NJ (US); Robert E. Tench, Allentown, PA (US); Alexandre Amavigan, Whitehall, PA (US); Clement Romano, Strasburg (FR)

(73) Assignee: Cybel, LLC., Bethlehem, PA (US)

( * ) Notice: Subject to any disclaimer, the term of this patent is extended or adjusted under 35 U.S.C. 154(b) by 441 days.

(21) Appl. No.: 16/878,211

(22) Filed: May 19, 2020

(65) Prior Publication Data

US 2021/0367392 A1    Nov. 25, 2021

(51) Int. Cl.
  *H01S 3/00* (2006.01)
  *H01S 3/067* (2006.01)
  (Continued)

(52) U.S. Cl.
  CPC ........ *H01S 3/06758* (2013.01); *H01S 3/0675* (2013.01); *H01S 3/06716* (2013.01); *H01S 3/08013* (2013.01); *H01S 3/0941* (2013.01); *H01S 3/094042* (2013.01); *H01S 3/094076* (2013.01); *H01S 3/10023* (2013.01);
  (Continued)

(58) Field of Classification Search
  None
  See application file for complete search history.

(56) References Cited

U.S. PATENT DOCUMENTS 6,407,853 B1  6/2002  Samson et al.
6,476,960 B1  11/2002  Traynor et al.
(Continued)

FOREIGN PATENT DOCUMENTS

CN   105720467 A  * 6/2016  ......... H01S 3/06712
CN   108306168 A  * 2/2018  ............. H01S 3/161

OTHER PUBLICATIONS

Gouet et al; Realization and numerical simulation of a high power and high efficiency Holmium dope fiber laser at 2.1 um; 2020; IEEE Explore; p. 1 (Year: 2020).*

*Primary Examiner* — Mark Hellner
(74) *Attorney, Agent, or Firm* — Wendy W. Koba

(57) ABSTRACT

A hybrid optical amplifier is proposed that includes a preamplifier element formed of single-clad Ho-doped optical fiber and a power amplifier element formed of single-clad Tm-doped (or Tm—Ho co-doped) optical fiber. The preamplifier is used to impart gain to an input signal propagating at a wavelength $\lambda_S$ in the presence of a first pump beam operating at $\lambda_{P1}$, creating an amplified output over a defined transmission bandwidth. The power amplifier element is disposed at the output of the preamplifier element and provides an additional level of gain to the output of the preamplifier element in the presence of a second pump beam operating at $\lambda_{P2}$. A passband filter may be used between the preamplifier and the power amplifier to ensure that only wavelength components within the defined transmission bandwidth are applied as an output to the power amplifier.

24 Claims, 14 Drawing Sheets

(51) Int. Cl.
  *H01S 3/16*      (2006.01)
  *H01S 3/10*      (2006.01)
  *H01S 3/0941*    (2006.01)
  *H01S 3/08*      (2023.01)
  *H01S 3/094*     (2006.01)

(52) U.S. Cl.
  CPC .......... *H01S 3/10061* (2013.01); *H01S 3/161* (2013.01); *H01S 3/1608* (2013.01); *H01S 3/1616* (2013.01); *H01S 3/1618* (2013.01); *H01S 2301/02* (2013.01)

(56) References Cited

U.S. PATENT DOCUMENTS

| | | |
|---|---|---|
| 7,113,328 B2 | 9/2006 | Gomes et al. |
| 7,298,547 B1 | 11/2007 | Jiang et al. |
| 7,313,306 B2 | 12/2007 | Yamada et al. |
| 9,112,329 B2 | 8/2015 | Fan |
| 9,466,939 B2 | 10/2016 | Moulton et al. |
| 9,684,077 B2 | 6/2017 | Mead et al. |
| 10,348,051 B1 * | 7/2019 | Shah .................. G01S 17/34 |
| 10,483,711 B2 * | 11/2019 | Ahmadi ............ H01S 3/094003 |
| 2011/0222562 A1 * | 9/2011 | Jiang ...................... H01S 3/067 372/18 |
| 2018/0159296 A1 * | 6/2018 | Johnson .............. H01S 3/06758 |

\* cited by examiner

BROADBAND HYBRID OPTICAL AMPLIFIER OPERATION IN EYE-SAFE WAVELENGTH REGION

GOVERNMENT RIGHTS IN INVENTION

This invention was made with government support under NASA SBIR Phase I Contract No. 80NSSC19C0278. The government has certain rights in the invention.

TECHNICAL FIELD

The present invention relates to an optical amplifier for providing amplification in the two micron wavelength region and, more particularly, to a hybrid amplifier configuration comprising a Holmium-doped (Ho-doped) preamplifier stage and a Thulium-doped (Tm-doped) power amplifier stage, each stage based upon the use of single-clad optical fiber and amplified by a pump source based on an uncooled, multi-watt laser diode.

BACKGROUND OF THE INVENTION

There is a continuing need to develop optical systems that are capable of operating in the eye-safe wavelength range that spans generally from about 1900 nm to 2150 nm. Applications such as LIDAR, atmospheric sensing (e.g., $CO_2$), WDM communication systems, and the like, are among those that will need to rely on high performance optical devices that operate within this eye-safe wavelength region. The ability to provide a sufficient amount of signal power for these applications necessitates the development of amplifiers and high power laser sources.

While both TDFAs and HDFAs may be able to provide acceptable output power levels at these particular wavelengths, they have to date been found to be somewhat limited in terms of operating wavelength(s) that may be utilized, and may also exhibit a limited dynamic range for input signal power. The particular design of a current HDFA approach requires a complex pump scheme using multiple pump source inputs to a double-clad Ho-doped gain fiber, which may limit its efficiency. Additionally, the noise figure of these amplifier designs has not yet been fully evaluated.

The use of double clad Tm-doped fibers requires a temperature-stabilized 793 nm pump source, which is not an optimum choice for compact high performance packaged optical amplifier modules.

SUMMARY OF THE INVENTION

The needs remaining in the art are addressed by the present invention, which relates to a hybrid HDFA/TDFA using all single-clad doped fibers. The new architecture is capable of high optical output powers, exhibits a wide operating bandwidth and low NF, and additionally operates with an uncooled pump, leading to a high performance compact packaged amplifier module for operation within the eye-safe spectral region.

In accordance with the principles of the present invention, a doped fiber amplifier is proposed that includes a single-clad HDFA used as a preamplifier and a single-clad TDFA used as a power amplifier. The HDFA preamplifier provides as an output a relatively high input signal dynamic range (for example, over a wavelength range of about 2000-2150 nm) while maintaining a low noise figure value. The TDFA power amplifier is then able to provide the desired amount of gain or power to this high dynamic range preamplifier output. High gain amplifier configurations in the eye-safe 2 μm wavelength region are particularly well-suited for applications employing pulsed input sources, whose average input power is typically −20 dBm or less.

The inventive hybrid amplifier is intended to be of particular use in a master oscillator power amplifier (MOPA) configuration, with the HDFA preamplifier functioning as the seed laser input for the (TDFA) power amplifier. The HDFA preamplifier may be used in either a CW or pulse mode as the seed laser source for the MOPA.

Both the Ho-doped preamplifier and the Tm-doped power amplifier may utilize a co-propagating pump arrangement, a counter-propagating pump arrangement, or a combination of both co- and counter-propagating pump sources. In some embodiments, the gain fiber of the power amplifier may be co-doped with both Tm and Ho.

The amplifier elements may be formed of either standard single mode optical fiber (i.e., non-polarization-maintaining), or fiber of polarization-maintaining construction. For applications that operate with a single polarization signal, polarization-maintaining fiber is preferably used in order to maintain the orientation of the propagating signal along a designated axis without the need for additional polarization controlling elements.

It is contemplated that the hybrid amplifier of the present invention is an efficient amplifier by providing both gain over a long wavelength band (e.g., 2000-2150 nm) using a single-clad Ho-doped gain fiber, and power amplification of this extended wavelength band by using a single-clad Tm-doped gain fiber. It has been found that single-clad Tm-doped fiber can exhibit a pump-to-signal efficiency on the order of 80%, a significant improvement over prior art configurations using double-clad TDFAs.

Preferred embodiments of the present invention are based on the use of an uncooled pump to generate pump beams at the wavelengths required for both the HDFA preamplifier and TDFA power amplifier. The use of an uncooled pump eliminates the need to include temperature control circuitry within the amplifier module, therefore improving the efficiency of the amplifier and simplifying the control circuitry associated with the pump sources.

An exemplary embodiment of the present invention may take the form of a hybrid optical amplifier for operation within an eye-safe wavelength region from about 2000 nm to about 2200 nm, where the hybrid optical amplifier includes a preamplifier element formed of a section of single-clad Ho-doped optical fiber and a power amplifier element formed of a section of single-clad Tm-doped (or Tm—Ho co-doped) optical fiber. The preamplifier is used to impart gain to an input signal propagating at a wavelength $\lambda_S$ within the eye-safe wavelength region in the presence of a first pump beam operating at a first pump wavelength $\lambda_{P1}$, creating an amplified output over a defined transmission bandwidth within the eye-safe wavelength region. The power amplifier element is disposed at the output of the preamplifier element and provides an additional level of gain to the output of the preamplifier element in the presence of a second pump beam operating at a second pump wavelength $\lambda_{P2}$. A pump supply is included and used to provide pump beams at appropriate wavelengths to both the preamplifier element and the power amplifier element.

When the connection to an input optical signal is removed, the amplifier arrangement of the present invention may be used as a broadband ASE source, based upon the interaction of the pump beams with the gain fibers in each element.

Other and further embodiments and features of the present invention will become apparent during the course of the following discussion and by reference to the related drawings.

BRIEF DESCRIPTION OF THE DRAWINGS

Referring now to the drawings, where like numerals represent like parts in several views.

DETAILED DESCRIPTION

Figure 1:
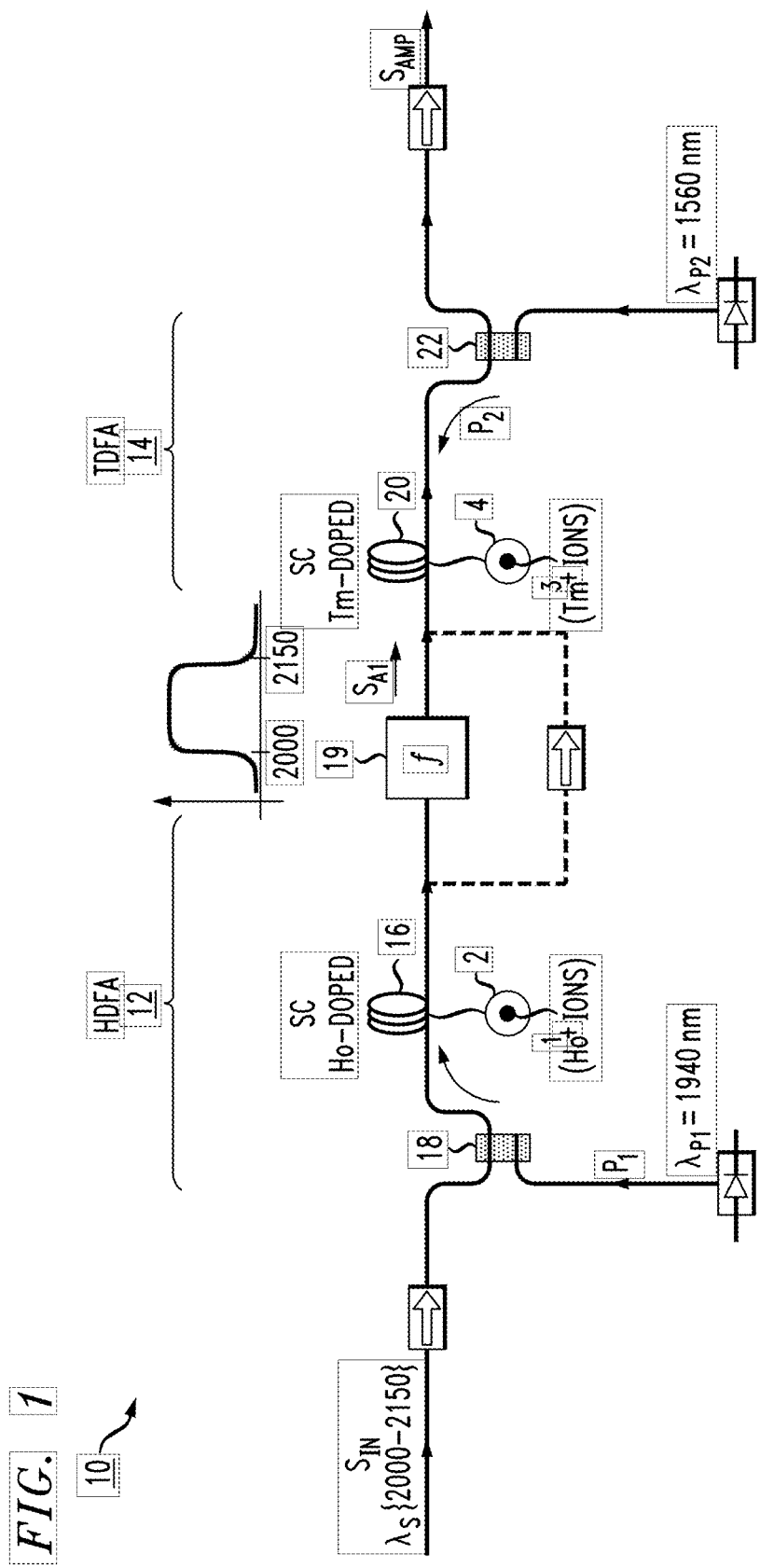
FIG. 1 illustrates an exemplary embodiment of a hybrid optical fiber amplifier formed in accordance with the principles of the present invention.

FIG. 1 illustrates an exemplary hybrid fiber amplifier 10 formed in accordance with the principles of the present invention. Here, the term "hybrid" is used to describe the use of two different rare-earth dopants (Ho and Tm), in two separate amplifier stages, to provide amplification of a propagating input signal. As mentioned above, the inventive hybrid amplifier is particularly designed to operate within an eye-safe wavelength range (e.g., from about 2000-2150 nm). FIG. 1 depicts an input optical signal ($S_{IN}$) operating at a wavelength $\lambda_S$ within this range.

Hybrid fiber amplifier 10 is shown as including a preamplifier stage comprising a Ho-doped fiber amplifier (HDFA) 12, followed by a power amplifier stage formed as a Tm-doped fiber amplifier (TDFA) 14 (in some configurations, as described below, the gain fiber in the power amplifier stage may comprise a co-doped Ho—Tm fiber). Preamplifier HDFA 12 is focused primarily on creating gain for input signals across a relatively high dynamic range in a bandwidth from 2000-2150 nm, while maintaining a relatively low noise figure (NF). The ability to provide at least a moderate level of amplification over a wide dynamic range is important, since most conventional semiconductor laser diodes that emit in the eye-safe wavelength range are limited in the amount of power they are able to generate.

HDFA 12 includes a section of single-clad Ho-doped optical fiber 16 (referred to at times below as the "gain fiber" of HDFA 12), where an inset in FIG. 1 depicts the "single clad" cross-section of optical fiber 16 as including a Ho-doped core region 1 and a surrounding cladding layer 2. The incorporation of Ho⁺ ions in the silica core of a single-clad optical fiber is known in the art to provide amplification of a propagating light signal in the presence of a pump beam operating at an appropriate wavelength. As shown in FIG. 1, a first pump beam $P_1$ operating at a pump wavelength $\lambda_{P1}=1940$ nm is used to interact with the Ho⁺ ions in core region 1 of gain fiber 16 in a manner that imparts gain to input signal $S_{IN}$.

It is to be understood that the use of a preamplifier pump at the wavelength of 1940 nm is only one of several choices to provide amplification in the presence of Ho ions. Other pump wavelengths, corresponding to other absorption bands of Ho may be used in the HDFA preamplifier of the present invention (e.g., $\lambda_{P1}$ in the range of about 1125-1150 nm, or about 1230 nm, etc.). Moreover, it has been found that increasing the pump wavelength to 2000 nm or greater shifts the spectral operating band of the preamplifier to markedly higher wavelengths, enabling access to higher output wavelengths with significant power in the region of about 2130 nm. Additionally, it is contemplated that shifting the pump wavelength to 1880 nm or lower may significantly improve the gain and output power performance of an HDFA preamplifier and, therefore, pump wavelengths in the range of 1840-1960 nm, and perhaps up to 2000 nm, should be considered as another set of available values for use in the configurations of the present invention.

A wavelength division multiplexer (WDM) 18 is used in this embodiment to combine the incoming optical signal $S_{IN}$ (operating at a wavelength $\lambda_S$ within the eye-safe wavelength region) and first pump beam $P_1$, introducing the combination into HDFA 12. In particular, both $S_{IN}$ and $P_1$ are coupled into Ho-doped core region 1 of single-clad Ho-doped optical fiber 16. The optical energy at pump wavelength $\lambda_{P1}$ interacts with the Ho⁺ ions and transfers energy to propagating signal $S_{IN}$, thus providing an amplified version of the input signal (denoted here as $S_{A1}$) as the output from HDFA 12. Throughout the remainder of this description, the output from HDFA 12 may also be referred to as the "intermediate" (i.e., inter-stage) amplified signal. Various factors influence the dynamic range achieved by HDFA 12 while maintaining a relatively low noise figure. For example, pump input power and pump wavelength, as well as the length and dopant concentration of gain fiber 16, are but a few factors that may be adjusted to maximize the results.

TDFA 14 is shown in FIG. 1 as separated from HDFA 12 by an optical filter 19 that takes the form of a passband filter (as depicted in the diagram), with a passband coextensive with the bandwidth provided by HDFA 12 (e.g., 2000-2150 nm). While not required, the inclusion of passband filter 19 is useful in shaping the output from HDFA 12 so that only the transmission band of interest is applied as an input to the power amplifier TDFA 14. Additionally, the presence of passband filter 19 prevents any amplified spontaneous emission (ASE) from TDFA 14 from propagating in the reverse direction into HDFA 12. An optical isolator may also be disposed at the interface between HDFA 12 and TDFA 14, with similar isolators positioned at the input and output of hybrid optical isolator 10. Even though these isolators have not been particularly described or enumerated, it is understood that isolators of this type prevent the propagation of reflections (include pump beams, as discussed below) within the inventive hybrid amplifier, where the reflections are known to increase the noise level within the amplifier and diminish the available output power. Similar isolators are illustrated in the various other embodiments as will be discussed in detail below, and perform a similar well-known function.

Turning now to the particulars of TDFA 14, it is seen as including a section of single-clad Tm-doped optical fiber 20. An inset associated with optical fiber 20 shows a Tm-doped core region 3 surrounded by a single cladding layer 4. A second pump beam $P_2$, here operating at a wavelength $\lambda_{P2}$ appropriate for interacting with Tm⁺ ions (for example, $\lambda_{P2}$ of about 1560 nm) is passed through a WDM 22 positioned at the output of optical fiber 20. WDM 22 functions to inject second pump beam $P_2$ into core region 3 of single-clad Tm-doped optical fiber 20, where it interacts with the amplified output signal $S_{A1}$ from HDFA 12 (which may be a filtered version of the preamplifier output if passband filter 19 is used). The use of a relatively high-power pump beam $P_2$ provides the gain necessary for a specific application, creating the amplified output signal $S_{AMP}$ from hybrid amplifier 10, as shown in FIG. 1. TDFA 14 is used to efficiently create the majority of signal power provided by hybrid amplifier 10, taking full advantage of highly efficient ion-ion interactions associated with the use of Tm dopant within gain fiber 20.

Figure 2:
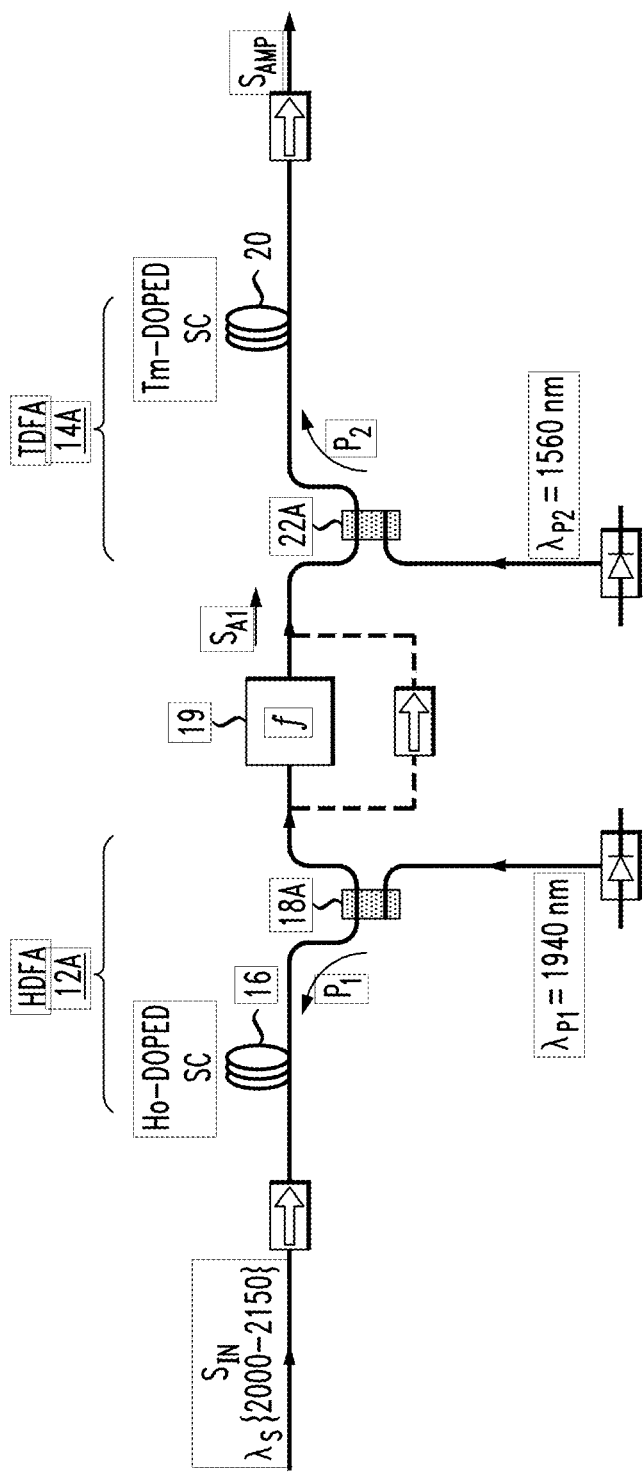
FIG. 2 depicts an alternative configuration of the embodiment of FIG. 1, utilizing a different arrangement of pump sources for providing amplification within the doped gain fibers.

While HDFA 12 is depicted as a "co-propagating" amplifier arrangement where the input optical signal $S_{IN}$ and pump beam $P_1$ propagate in the same direction through single-clad Ho-doped gain fiber 16, TDFA 14 is configured in this embodiment as a counter-propagating amplifier arrangement, where second pump beam $P_2$ is coupled into the output of single-clad Tm-doped optical fiber 20 and therefore propagates through gain fiber 20 in a direction counter to that of intermediate amplified signal $S_{A1}$. FIG. 2 illustrates an alternative embodiment of the present invention, denoted as hybrid amplifier 10A, which uses a different configuration of pump sources.

In particular, FIG. 2 illustrates an HDFA 12A that utilizes a counter-propagating pump beam P1 to provide amplification within single-clad Ho-doped fiber 16. A WDM 18A is shown as positioned beyond the output of gain fiber 16 and is configured to couple pump beam P1 into the output of gain fiber 16 so that it propagates counter to the incoming optical signal SIN. Also shown in this embodiment is the use of a co-propagating pump beam P2 with TDFA 14. A WDM 22A is positioned at the input of single-clad Tm-doped fiber 20 and used to couple both the amplified output from HDFA 12A and pump beam P2 into gain fiber 20.

For various applications, it is preferred to use polarization-maintaining (PM) fiber along the signal paths of HDFA 12 and TDFA 14, including the use of PM fiber in the formation of single-clad Ho-doped gain fiber 16 and single-clad Tm-doped gain fiber 20. In particular, when there is a need to provide a consistent state of polarization of a propagating optical signal, the use of PM fiber maintains the orientation of the propagating signal along a designated axis without the need for additional polarization controlling elements. While PM fiber is preferred for use along the signal path, pump source 30 and the pump paths between source 30 and each amplifier stage are generally formed of standard single mode optical fiber.

Other arrangements for providing additional output power may utilize a power amplifier that is co-doped with both Ho and Tm. Given the "hybrid" design of the present invention, the use of a co-doped gain fiber within the power amplifier allows for any residual preamplifier pump light that was not absorbed by the preamplifier's Ho-doped gain fiber to thus provide additional amplification by reacting with the Ho dopant included within the co-doped gain fiber of the power amplifier. The use of a co-doped gain fiber within the power amplifier may also eliminate the need to perhaps include a filter at the output of the preamplifier to remove residual pump, where the need to include such a filter inevitably introduces unwanted loss into the propagating signal.

As mentioned above, an aspect of the present invention is the use of an uncooled pump source, which eliminates the need to incorporate circuitry required for monitoring and controlling the operations of laser diodes that are often used to supply pump beams.

Figure 3:
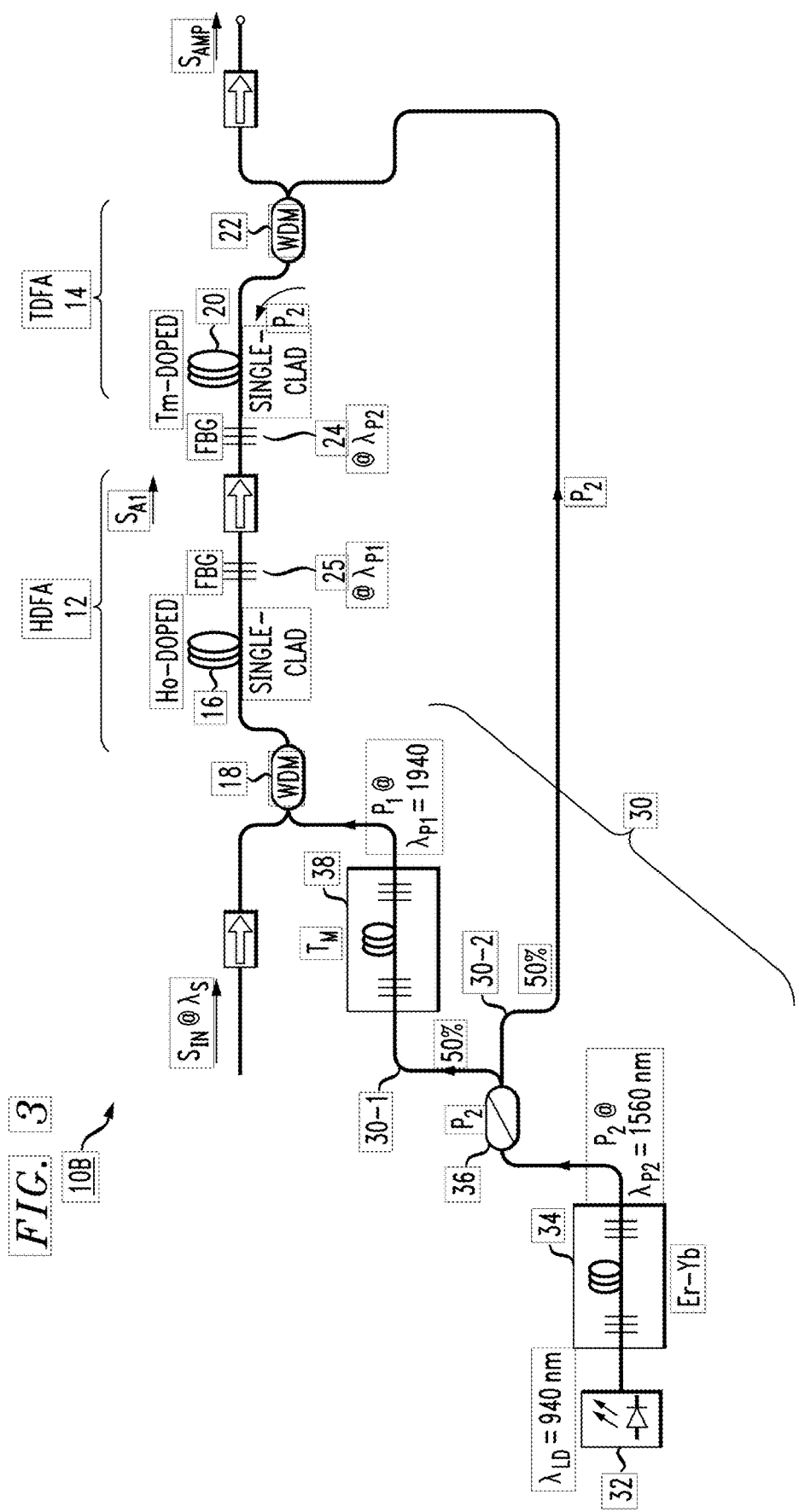
FIG. 3 illustrates an embodiment of the present invention that utilizes a single pump source to provide pump beams at wavelengths suitable for generating gain in single-clad Ho-doped optical fiber and single-clad Tm-doped optical fiber.

FIG. 3 illustrates an embodiment of the present invention, denoted as hybrid amplifier 10B that utilizes a single pump source 30 to provide both pump beam $P_1$ (operating at $\lambda_{P1}$) to HDFA 12 and pump beam $P_2$ (operating at $\lambda_{P2}$) to TDFA 14. In accordance with the principles of the present invention, a multi-watt semiconductor laser diode 32 included within pump source 30 is operated as an uncooled device, providing pump energy at a wavelength $\lambda_{LD}$ of 940 nm. Input pump beam $P_{IN}$ is shown as then passing through a fiber laser 34, which in this case comprises a co-doped Er—Yb fiber laser. Input pump beam $P_{IN}$ interacts with the co-doped gain fiber within fiber laser 34 in a manner that creates as an output beam operating at a wavelength suitable for use as one of the pump inputs to the amplifier stages. In this particular example, fiber laser 34 is configured to specifically provide an output beam operating at 1560 nm, which as described above is used as second pump beam $P_2$ to generate gain within TDFA 14.

Continuing with the description of pump source 30, pump beam $P_2$ output from fiber laser 34 is next passed through a pump power splitter 36, which directs a first portion of pump beam $P_2$ along a first pump path 30-1 toward HDFA 12 and directs a second portion of pump beam $P_2$ along a second pump path 30-2 toward TDFA 14. While the power ratios used by splitter 36 may vary from application to application, it is often the case where an equal amount of pump power is sent along each path (i.e., splitter 36 is configured as a 50/50 power divider). As mentioned above, the portion of pump beam $P_2$ propagating along second pump path 30-2 is operating at a pump wavelength suitable for providing gain within TDFA 14. Therefore, second pump path 30-2 is shown as coupled to the pump input port of WDM 22.

Referring now to the details of providing a pump input at an appropriate wavelength $\lambda_{P1}$ for HDFA 12, FIG. 3 illustrates pump source 30 as further comprising an additional fiber laser 38 that is disposed along pump path 30-1 toward HDFA 12. In particular, fiber laser 38 comprises a Tm-doped fiber laser that is configured to shift the wavelength of the propagating pump beam from $\lambda_{P2}$=1560 nm to the desired $\lambda_{P1}$ value of 1940 nm. The output from fiber laser 38 is thus defined as first pump beam $P_1$ (operating at $\lambda_{P1}$=1940 nm), which is provided as the pump input to WDM 18, as shown in FIG. 3.

Also shown in the embodiment of FIG. 3 is a pair of fiber Bragg gratings (FBGs) 24, 25 may be used in conjunction with TDFA 14 and HDFA 12, respectively. FBG 24 functions as a wavelength-dependent filter and is particularly formed to have a center wavelength that matches the wavelength $\lambda_{P2}$ of second pump beam $P_2$. Depending on a variety of parameters, including the length of gain fiber 20 and the output power of pump beam P2, there may be "residual" pump energy that exits gain fiber 20 and continues to propagate in the counter direction along the signal path of hybrid amplifier 10B. The inclusion of FBG 24 functions to reflect (re-direct) pump wavelength $\lambda_{P2}$, so that any residual pump will pass a second time through gain fiber 20 (imparting additional gain to the propagating signal $S_{A1}$). FBG 25 is similarly formed and provides a similar function, but in this case exhibits a center wavelength of $\lambda_{P1}$. It is to be noted that hybrid amplifier 10B is illustrated as not including passband filter 19, since as mentioned above the filter is useful, but not required.

Figure 4:
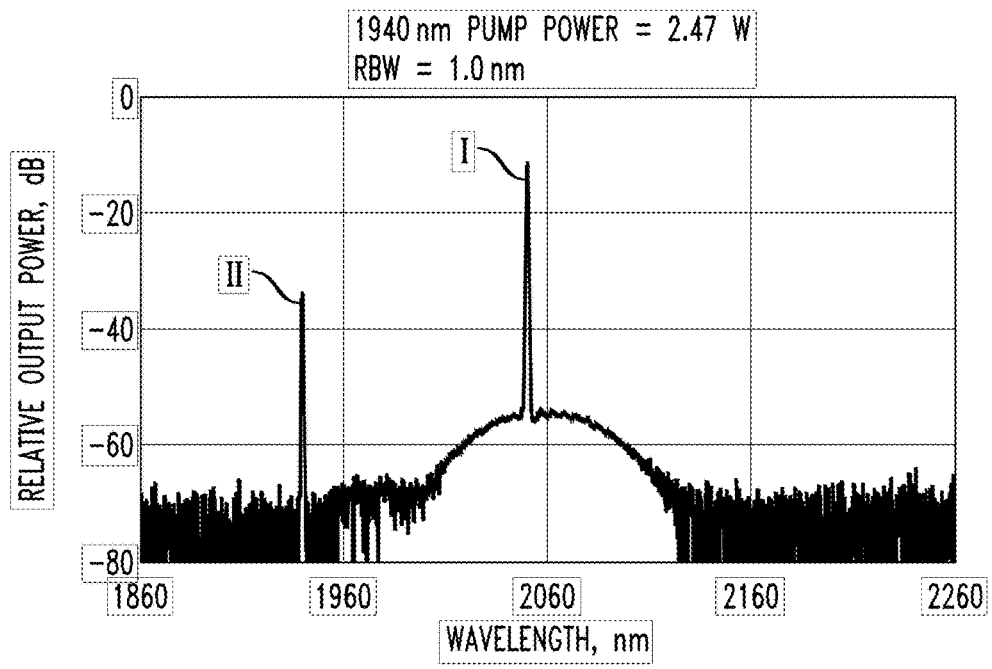
FIG. 4 contains a plot of the spectral response from an exemplary HDFA preamplifier as depicted in the embodiment of FIG. 3.

FIG. 4 contains a plot of an exemplary spectral response from an exemplary preamplifier HDFA 12 over a portion of the eye-safe wavelength region, based upon an input signal $S_{IN}$ operating at an input signal wavelength $\lambda_S$=2051 nm (i.e., an input wavelength within the eye-safe band). For the purposes of collecting this data, input signal $S_{IN}$ was configured to maintain a constant input power of −1.6 dBm. The data is associated with the configuration as shown in FIG. 3, with pump beam $P_1$ having a power of about 2.5 W at the input of HDFA 12. The spectral response as shown in FIG. 4 includes an output power peak I of about 0.580 W for input signal $S_{IN}$ at its propagating wavelength $\lambda_S$ of 2051 nm. Also evident in the spectral response is a second peak (denoted II in FIG. 4), which is associated with a pump feedthrough power. By virtue of using a co-propagating arrangement, the output from HDFA 12 thus also includes some remaining power at the pump wavelength. In this case, pump power peak II is about 23 dB below the signal peak at I, indicating efficient use of pump power within HDFA 12.

Figure 5:
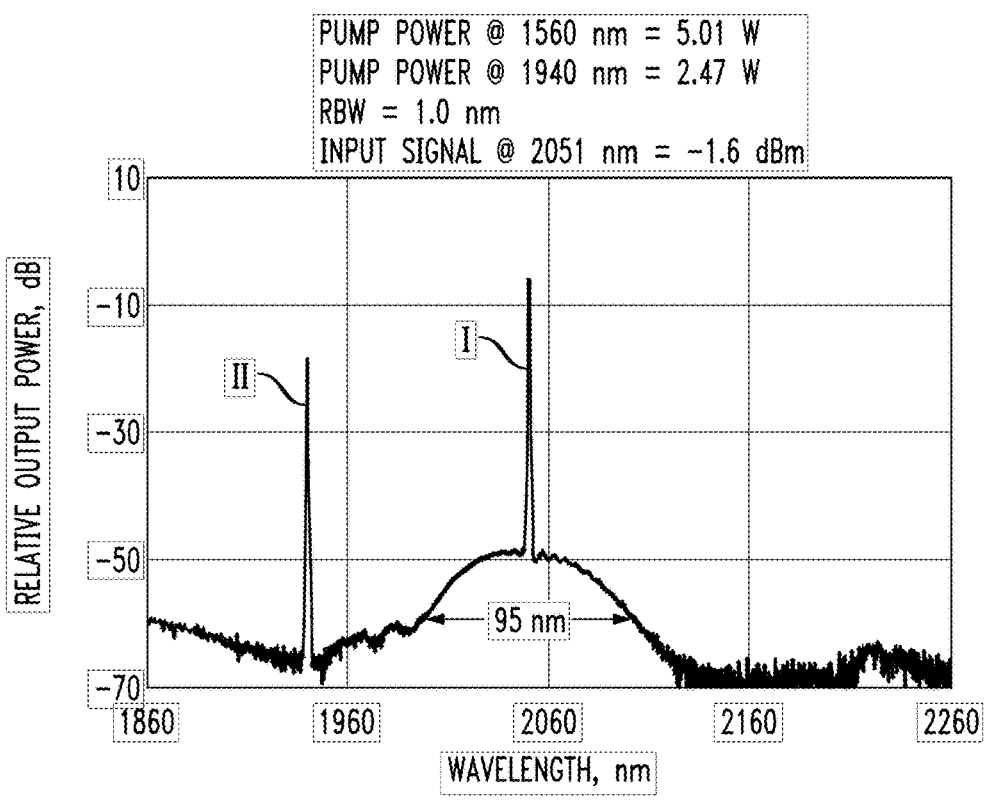
FIG. 5 is a plot of the output spectrum from a hybrid fiber amplifier configured in the manner shown in FIG. 3.

FIG. 5 is a plot of the output spectrum of the full hybrid amplifier 10; that is, the output from TDFA 14 for the configuration as shown in FIG. 3. For this particular data, pump beam $P_2$ was configured to exhibit a power of about 5 W at the input to TDFA 14. Here, the total signal output power is shown to be about 2.93 W, and the total pump feedthrough power is now about 14 dB down from the peak of the signal, the relative increase in the pump peak being an indication that TDFA 14 provides some additional amplification to this input pump light. Based on a −10 dB width of the ASE below the signal peak, an estimated 3 dB output power bandwidth of hybrid amplifier 10 is shown to be about 95 nm, spanning the eye-safe wavelength range from 2000 nm to 2095 nm.

Figure 6:
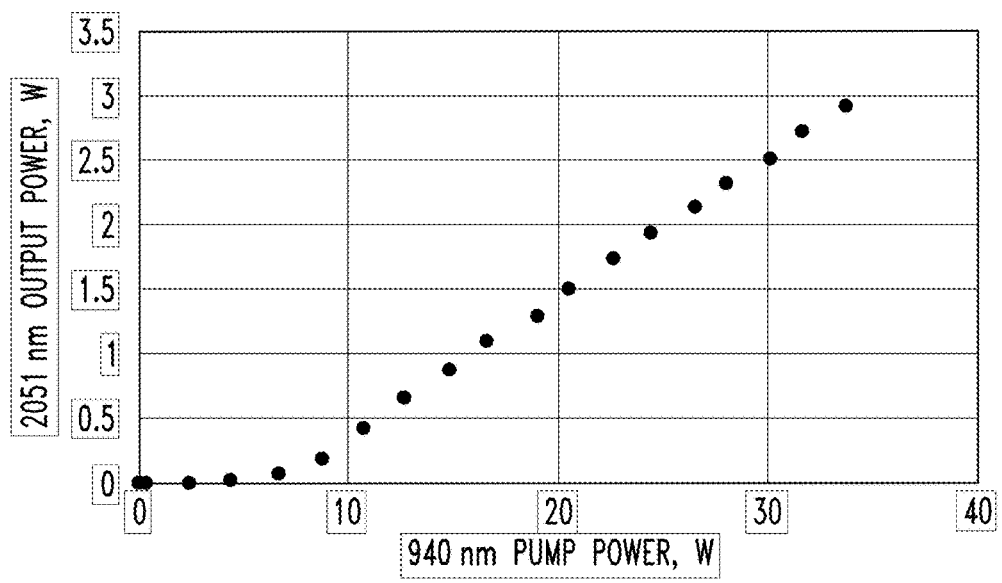
FIG. 6 is a graph of output power from the inventive hybrid amplifier as a function of the input optical power from a laser diode used as part of the pump source.

An important aspect of the present invention is the use of an uncooled laser diode as the "seed" for generating multi-watt pump beams at the wavelengths appropriate for use with both types of gain fiber. FIG. 6 illustrates the signal power at the output of hybrid amplifier 10 (i.e., the power of amplified output signal $S_{AMP}$) as a function of the input "seed" power delivered by laser diode 32 to pump fiber laser 34, using the same input parameters as described above. The maximum output signal power for $S_{AMP}$ is shown to be about 2.93 W, associated with a pump power of 33.7 W from laser diode 32. The variation of output power with pump power is shown as following a linear trend above 9 W with a slope of 10.5%.

Figure 7:
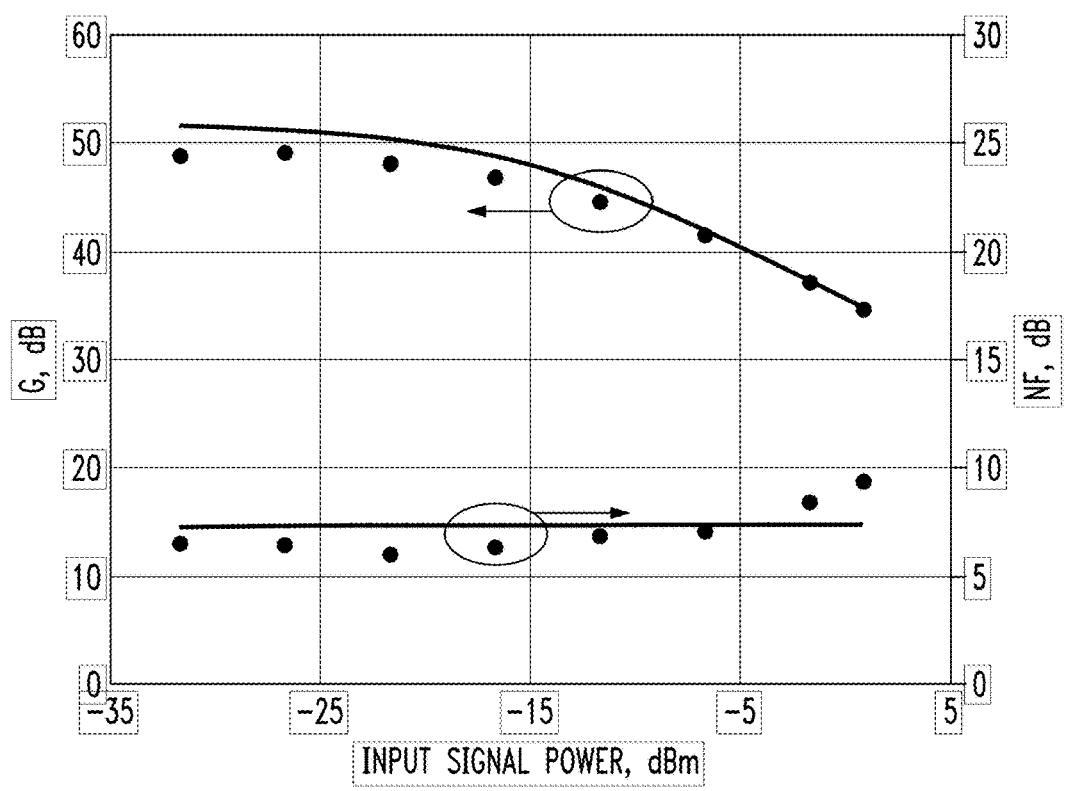
FIG. 7 shows both experimental and simulated internal gain (G) and noise figure (F) for a hybrid amplifier such as shown in FIG. 3.

FIG. 7 shows both experimental and simulated internal gain (G) and NF values for the hybrid amplifier 10 over a power range for input signal $S_{IN}$ from about −35 dBm to about +5 dBm (all measured for $S_{IN}$ @ $\lambda_S$=2051). In these plots, the individual points are associated with measured experimental results, and the lines are from simulation results. The maximum small signal gain at $\lambda_S$=2051 nm is measured to be 49.1 dB, with the simulated gain defined as 51.5 dB, which agrees relatively well with the measured experimental data. The minimum experimental small signal NF is 6.45 dB, and the simulated value is 7.23 dB, again indicating good agreement. This high G and low NF indicate that the inventive hybrid amplifier is useful as a preamplifier for lightwave communication systems, and also as an amplifier for pulsed input signals with low duty cycles. The evolution of G and NF with $P_s$ shows a good match between experiment and simulation and follows the expected trend for a high gain fiber optical amplifier. The input signal dynamic range for G>35 dB is 37.4 dB.

It is to be noted that the lengths optical fiber chosen for the Ho- and Tm-doped fibers in the configuration used to create the data shown in FIGS. 4-7 was optimized for a signal wavelength $\lambda_S$ of 2051 nm. The utilization of somewhat longer fiber lengths is expected to extend the spectral response of the inventive hybrid amplifier to wavelengths as high as 2150 nm. Additionally, the maximum output power is presumed to scale linearly with available pump power and, therefore, an output signal power of 10 W should therefore be possible using a pump source such as source 30 shown in FIG. 3.

Another factor that influences amount of amplification that as achieved, as well as the gain bandwidth and noise figure, is the propagation direction of the pump beam through the amplifying medium. As shown and discussed above, hybrid amplifier 10B of FIG. 3 is based upon the use of a co-propagating pump beam $P_1$ in HDFA 12 and a counter-propagating pump beam $P_2$ in TDFA 14.

Figure 8:
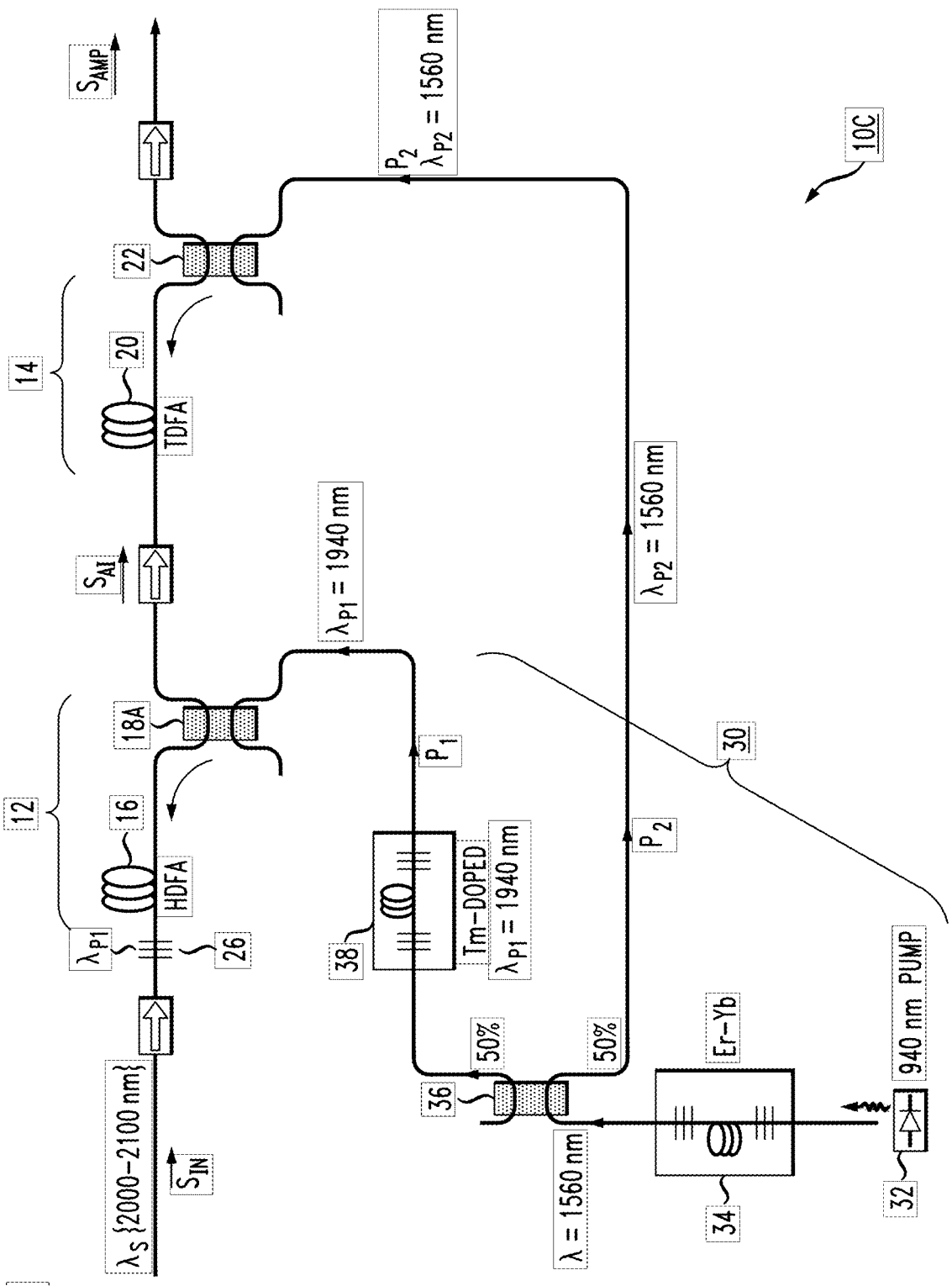
FIG. 8 illustrates an alternative configuration of the embodiment of FIG. 3, in this case using counter-propagating pump beams for both the HDFA preamplifier and the TDFA power amplifier.

FIG. 8 illustrates an alternative embodiment of the present invention, denoted as hybrid amplifier 10C, which uses counter-propagating pump inputs for both amplifier stages. In particular, hybrid amplifier 10C includes a counter-pumped HDFA 12C, where in this case a WDM 18C is disposed beyond the output of single-clad Ho-doped gain fiber 16 and is used to direct first pump beam $P_1$ (operating at $\lambda_{P1}$ of 1940 nm) into the output of gain fiber 16. Pump beam $P_1$ thus propagates in the opposite direction as input optical signal $S_{IN}$. In contrast to the co-propagating arrangement for HDFA 12 of FIG. 3, counter-propagating pump beam $P_1$ in the arrangement of FIG. 8 interacts with propagating input signal $S_{IN}$ in a very different manner. In particular, since the power level of pump beam $P_1$ is greatest at the far-end of single-clad Ho-doped optical fiber 18 and thereafter diminishes as it propagates towards the input end of gain fiber 12 (where the power $P_s$ of the input signal $S_{IN}$ is the greatest), the interaction provides greater slope efficiency and power conversion efficiency for a similar amount of gain (in terms of magnitude). The use of a counter-propagating pump in preamplifier HDFA 12 also prevents feedthrough of the pump to power amplifier TDFA 14, resulting in higher signal power at the output of hybrid amplifier 10C.

In some configurations of hybrid amplifier 10C, an FBG 26, with a center wavelength of $\lambda_{P1}$ may be included at the input to HDFA 12C and used in the same manner as FBGs 24, 25 discussed above (that is, re-direct residual pump energy back into HDFA 12C). The remaining components of hybrid amplifier 10C, including both TDFA 14 and pump source 30, are essentially the same (and include the same elements), as discussed above in association with hybrid amplifier 10B of FIG. 3. Thus, in similar fashion, an incoming optical signal $S_{IN}$ first passes through HDFA 12C and is initially amplified to create intermediate amplified signal $S_{A1}$. This amplified output from HDFA 12C is then passed through TDFA 14, where the presence of pump beam $P_2$ interacts with the Tm ions in gain fiber 20 to generate amplified output signal $S_{AMP}$ as the output of hybrid amplifier 10C.

Figure 9:
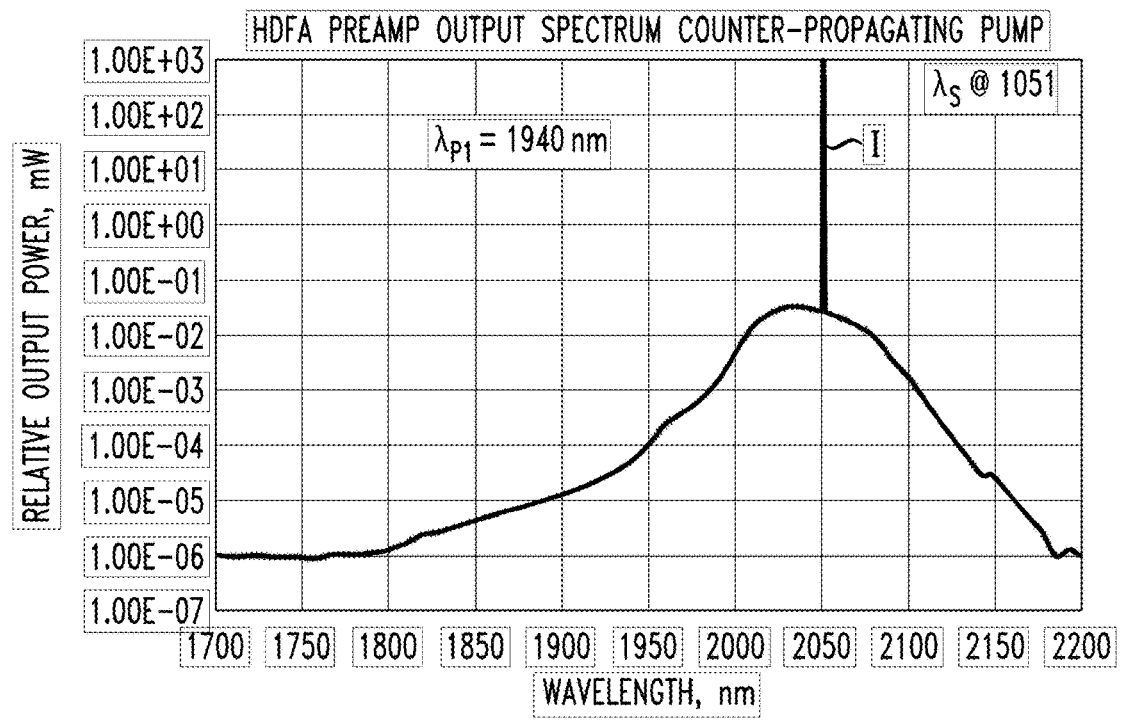
FIG. 9 contains a plot of the simulated output power from the counter-pumped HDFA preamplifier as shown in FIG. 8.
Figure 10:
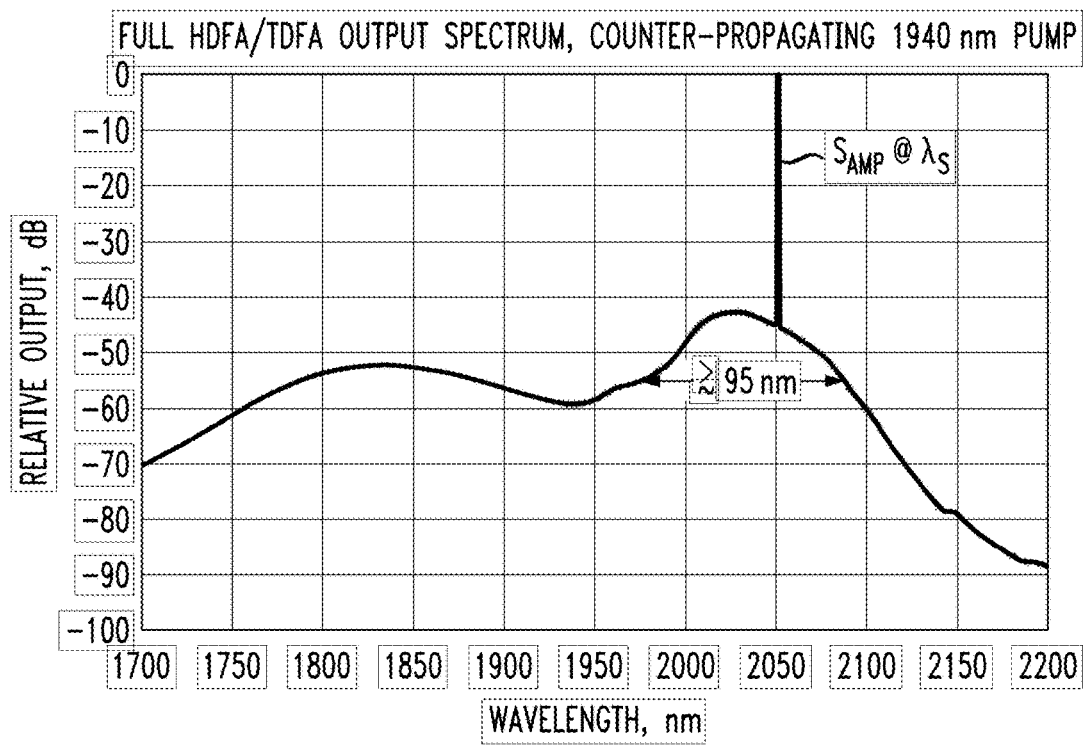
FIG. 10 is a plot of the simulated output from the complete hybrid amplifier arrangement as shown in FIG. 8.

FIG. 9 is a plot of the simulated amplifier output $S_{A1}$ from HDFA 12C. In comparison with the plot of FIG. 4, it is observed that the output power of intermediate amplified signal $S_{A1}$ is somewhat greater than that provided by the co-propagating pump configuration of FIG. 3 (i.e., 0.916 W vs. 0.580 W), an increase of about 2.31 dB. Inasmuch as pump beam $P_1$ propagates in the reverse direction through gain fiber 16, there is no "feedthrough" of the pump into amplified output signal $S_{A1}$ and thus no spike in output at the pump wavelength. FIG. 10 is a plot of the simulated amplified output $S_{AMP}$ from hybrid amplifier 10C. In comparison to the results shown in FIG. 5 for hybrid amplifier 10B, the total output signal power for hybrid amplifier 10C is shown to be about 4.178 W, an increase of 2.31 dB over the arrangement of FIG. 3 using a co-propagating pump in HDFA 12. A bandwidth of at least 95 nm, and most likely somewhat greater, is expected to be achieved with this configuration.

While not explicitly illustrated, it is to be understood that other configurations of a hybrid HDFA/TDFA formed in accordance with the principles of the present invention may utilize co-propagating pump inputs for both the HDFA and TDFA, or even an arrangement where the TDFA stage is counter-pumped and the HDFA stage is co-pumped. All of these arrangements are considered to fall within the scope of the present invention.

Figure 11:
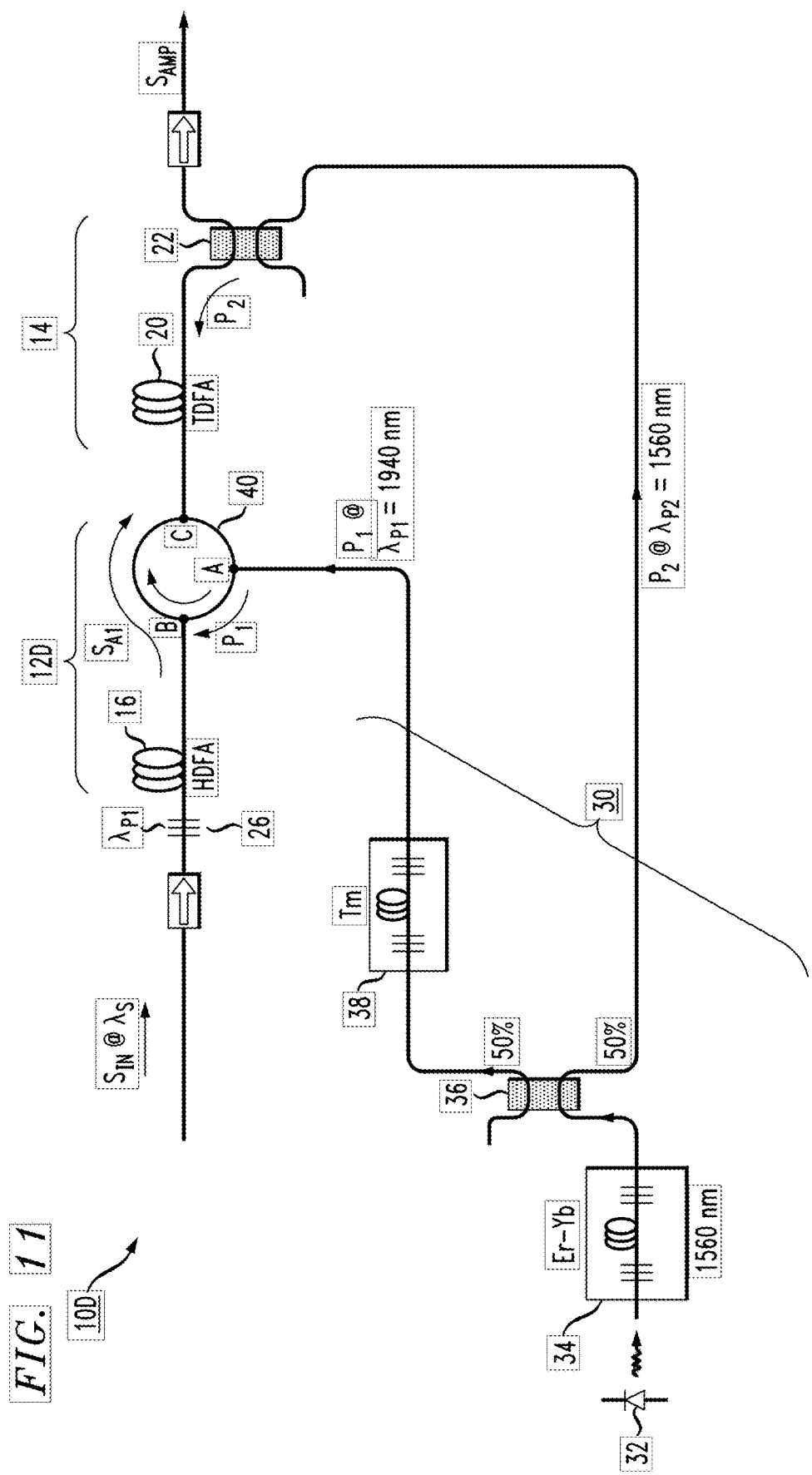
FIG. 11 shows an alternative embodiment of the present invention, where an optical circulator is used in place of a WDM/isolator combination to provide a counter-propagating pump input to the HDFA preamplifier.

Besides the use of WDMs (in combination with isolators) to introduce the pump beams to the amplifier stages, other embodiments of the present invention may use an optical circulator to perform this function. FIG. 11 illustrates an exemplary hybrid amplifier 10D that embodies this approach. As with hybrid amplifier 10C discussed above in association with FIG. 8, hybrid amplifier 10D of FIG. 11 utilizes essentially the same TDFA 14 and pump source 30.

However, instead of utilizing a WDM to introduce a counter-propagating version of first pump beam $P_1$ into single-clad Ho-doped fiber 16, HDFA 12D includes an optical circulator 40 to perform this function. Optical circulator 40 is arranged as a three-port circulator, with the set of ports denoted "A", "B", and "C". In this case, port A is used as a "pump input", port B is used as a "pump output"/ "amplified signal input", and port C is used as the "amplified signal" output. First pump beam $P_1$ is shown as entering port A of optical circulator 40, and thereafter exiting at port B to propagate through single-clad Ho-doped gain fiber 16 of HDFA 12D. In some applications, FBG 26, with a center wavelength of $\lambda_{P1}$ may be disposed at the input to HDFA 12D and used in the manner described above to reflect any remaining pump beam $P_1$ back into gain fiber 16.

Input signal $S_{IN}$, interacting with this counter-propagating pump light in the same manner as described above, creates first amplified signal $S_{A1}$, which is shown as provided as an input at port B of optical circulator 40. Amplified signal $S_{A1}$ thereafter exits optical circulator 40 at port C, which is coupled to TDFA 14 and, more particularly, to single-clad Tm-doped gain fiber 20 (it is to be noted that there is no need to include an optical isolator between stages by virtue of using uni-directional optical circulators).

Figure 12:
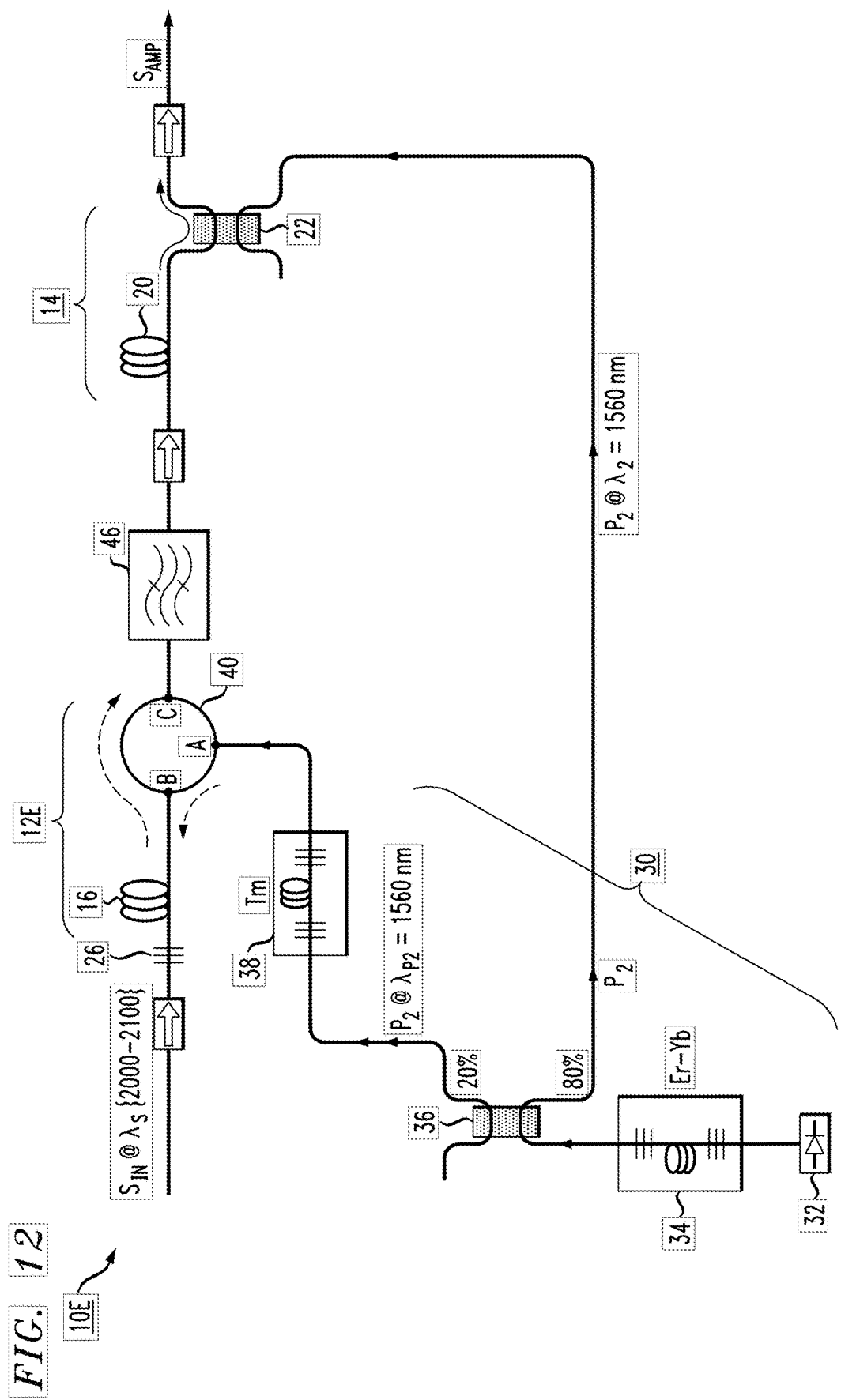
FIG. 12 illustrates another configuration of the hybrid amplifier of FIG. 11, in this case including a gain-shaping filter between the output of the preamplifier and the input to the power amplifier.

A slightly different configuration of a hybrid HDF/TDF amplifier is shown as amplifier 10E in FIG. 12. This embodiment is similar to amplifier 10D as discussed above in association with FIG. 11, but in this case includes a gain-shaping filter 46 between the output of HDFA 12E and the input of TDFA 14. As known in the art, and discussed in detail in our co-pending application Ser. No. 16/864,528, filed May 1, 2020 and incorporated herein by reference, a gain-shaping filter may be included at the interface between the amplifier stages to adjust the spectral response and power density of the output from HDFA 12E. In some cases, the inclusion of GSF 46 allows for TDFA 14 to impart a useful amount of gain over a wider bandwidth of operation within the eye-safe wavelength region.

Figure 13:
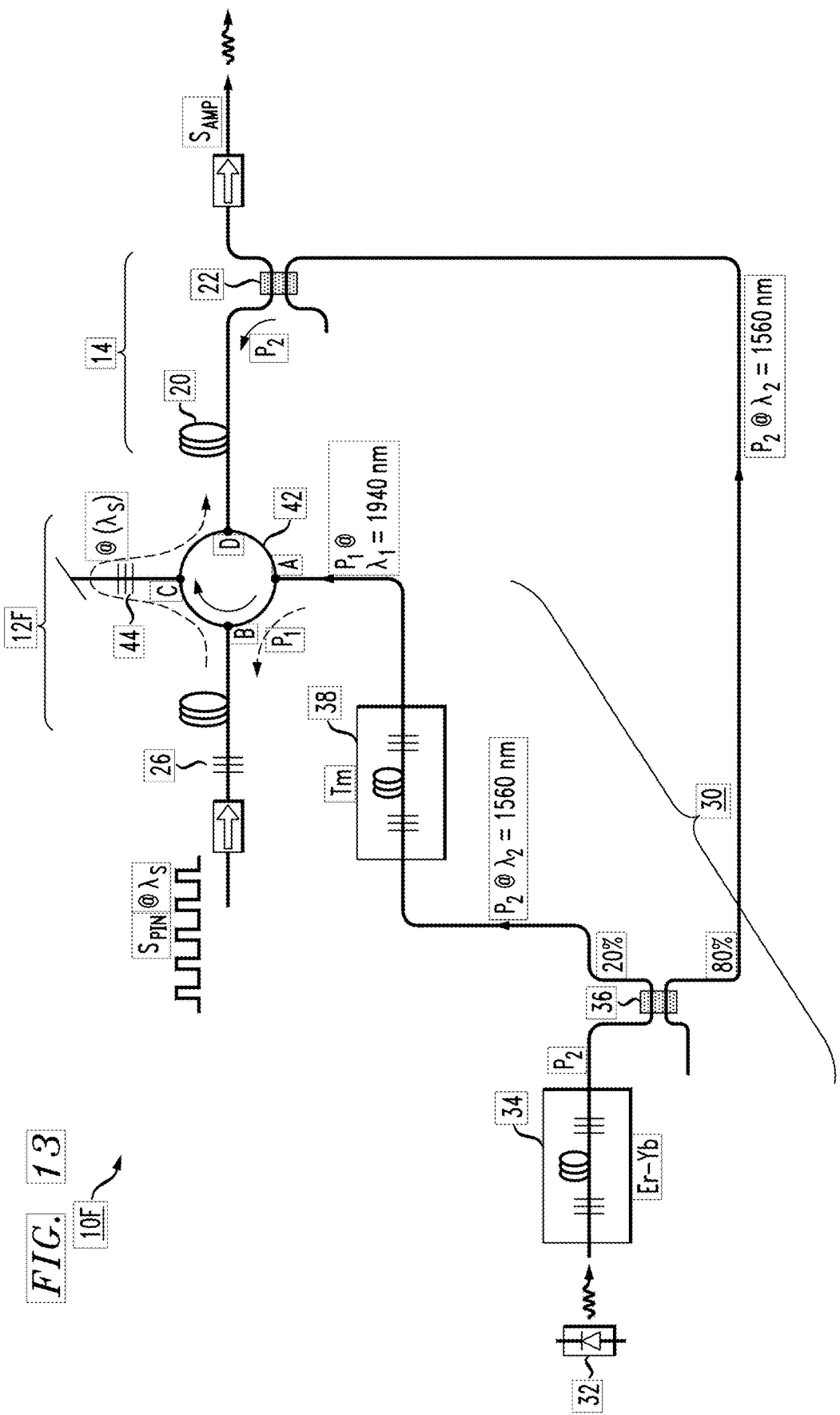
FIG. 13 illustrates a hybrid amplifier formed in accordance with the present invention to provide amplification of a pulsed input signal, including a reflective FBG to minimize unwanted wavelength components appearing in the pulses at the output of the HDFA preamplifier.

FIG. 13 illustrates another embodiment of a hybrid HDFA/TDFA amplifier formed in accordance with the present invention. Identified as hybrid amplifier 10F, this arrangement is particularly configured to provide amplification of a pulsed input signal (denoted $S_{P\_IN}$). As with the arrangements described above, hybrid amplifier 10F includes a TDFA 14 and pump source 30 that are essentially the same as those originally described in association with hybrid amplifier 10 of FIG. 3.

In this case, however, a four-port optical circulator 42 is included within an HDFA 12F and used to efficiently insert a narrowband FBG centered at pulse signal wavelength $\lambda_S$ at the output of HDFA 12. As with hybrid amplifier 10B discussed above, pump beam $P_1$ is introduced at port A of circulator 42 and thereafter directed into gain fiber 16 of HDFA 12F. Again, pump beam $P_1$ propagates in a direction counter to the incoming pulses, and may be reflected by FBG 24 to pass a second time through gain fiber 16.

Amplified output pulses $S_{P\_A1}$ exiting gain fiber 16 are shown in FIG. 13 as being directed into port B of optical circulator 42, where they propagate along within circulator 42 until reaching port C. In accordance with this embodiment of the present invention, a reflective FBG 44 is shown as coupled to port C of optical circulator 42. Reflective FBG 44 is formed to have a center wavelength that matches the wavelength $\lambda_S$ of input signal $S_{P\_IN}$, as well as an extremely narrowband bandwidth (on the order of 1 nm or less) to remove a significant majority of the ASE in the amplified output $S_{P\_A1}$ from gain fiber 16. While pulsed input signal $S_{P\_IN}$ (operating at wavelength $\lambda_S$) is amplified within gain fiber 16, broadband spontaneous emission in a region surrounding this wavelength is also present in the amplified output, as a result of the pulsed nature of the signal. Reflective FBG 44 is thus used in this embodiment of the present invention to remove a substantial portion of this background emission and provide a "clean" (filtered) amplified pulse train $S_{P\_A2}$ as the input to TDFA 14. The output from TDFA 14, as discussed above, is the final amplified version of the input pulse train.

Besides using specific, different pump wavelengths to create gain within the Tm-doped and Ho-doped optical fibers as described in above embodiments, it is also possible to utilize "in-band" pumping at a single, common pump wavelength (denoted $\lambda_{PC}$) that is able to create gain within both types of fiber.

Figure 14:
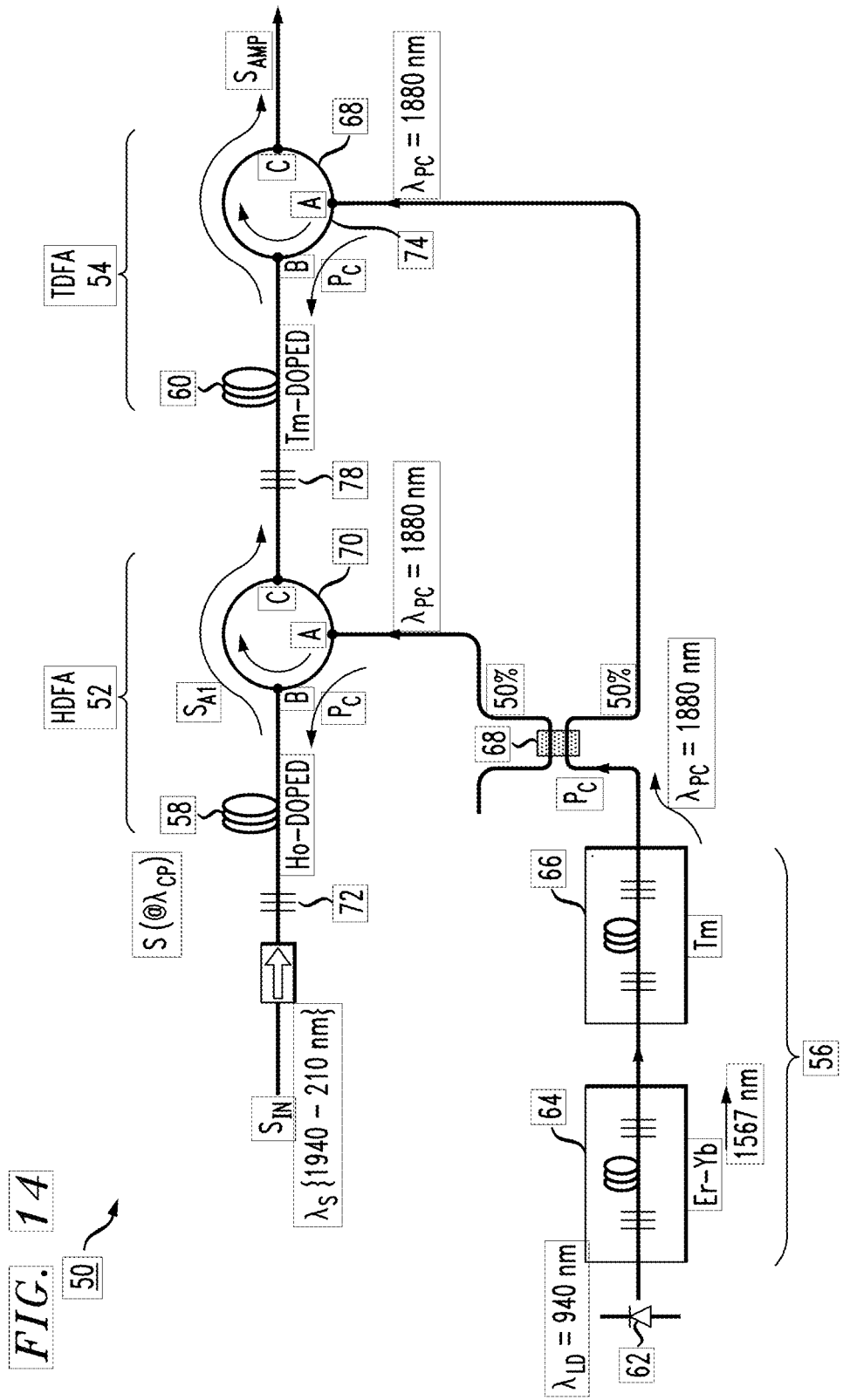
FIG. 14 is another embodiment of a hybrid fiber amplifier formed in accordance with the present invention, in this case particularly configured to use in-band pumping to create amplification within both the HDFA preamplifier and TDFA power amplifier.

FIG. 14 illustrates an exemplary hybrid HDFA/TDFA 50 that is formed in accordance with the present invention to utilize in-band pumping. Similar to the arrangements described above, hybrid amplifier 50 includes an HDFA 52 as an input stage, and a TDFA 54 as an output stage. As shown, hybrid amplifier 50 includes a pump source 56 that is used to supply a common pump beam $P_C$ at an in-band wavelength (shown here as 1880 nm) that is able to provide amplification in both a single-clad Ho-doped optical fiber 58 within HDFA 52 and a single-clad Tm-doped optical fiber 60 within TDFA 54.

In accordance with this embodiment of the present invention, pump source 56 is based upon the use of an input laser diode 62 (similar to the arrangements described above) to provide a pump input "seed" at a wavelength $\lambda_{LD}$ of 940 nm. The emission from laser diode 62 is shown as applied as an input to a first fiber laser 64, which comprises an Er—Yb doped fiber laser that is configured to provide an output beam operating at a wavelength of 1560 nm (as discussed above). The output from first fiber laser 64 is then passed through a second fiber laser 66, which in accordance with this embodiment of the present invention comprises a Tm-doped fiber laser that is configured to provide a pump beam output $P_C$ at an in-band wavelength of 1880 nm that is able to impart amplification within both Ho-doped fiber 58 and Tm-doped fiber 60. An optical splitter 68 is included in pump source 56 to provide divide pump beam $P_C$, similar to the configurations described above, directing a first portion $P_{C1}$ toward HDFA 52 and a second portion $P_{C2}$ toward TDFA 54.

In the arrangement of FIG. 14, a first optical circulator 70 is used to direct the flow of beam $P_{C1}$ in a counter-propagating direction through Ho-doped fiber 58, and ultimately direct the amplified output signal $S_{AC}$ out of port C and toward TDFA 54. A second optical circulator 72 is similarly utilized as part of TDFA 54 to introduce pump beam $P_{C2}$ into Tm-doped fiber 60, providing the amplified output signal $S_{AMP}$ out of its port C, as shown in FIG. 14.

Figure 15:
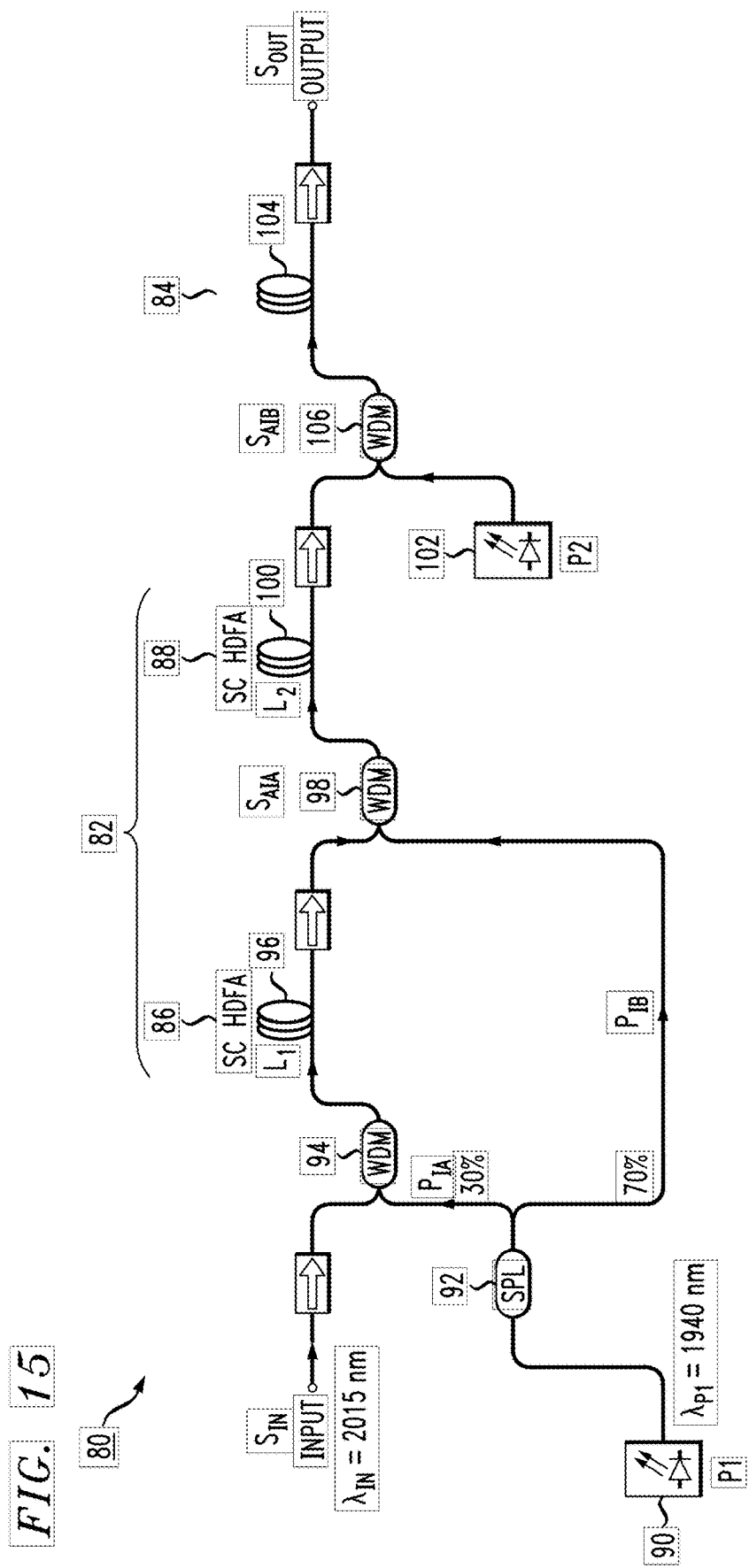
FIG. 15 shows yet another embodiment of the present invention, in this case where the HDFA preamplifier comprises a two-stage amplifier.

FIG. 15 illustrates an alternative embodiment of the present invention. Here, a hybrid amplifier 80 is shown as including a multi-stage preamplifier 82 that is used in combination with a single stage power amplifier 84. In this particular configuration, multi-stage preamplifier 82 comprises a pair of concatenated amplifier stages 86, 88, with each amplifier stage taking the form of a single-clad HDFA. A single pump source 90 is used in this particular arrangement to supply the pump light input at $\lambda_{P1}$ to both first stage 86 and second stage 88 (alternatively, it is to be understood that each stage may include its own pump source, operating at a power appropriate for that stage).

A power splitter 92 is used in this particular embodiment to control the ratio of pump powers within the preamplifier stages, creating two separate pump beams. A first pump beam $P_{1A}$ output from power splitter 92 (operating at a first power level $P_{P1A}$) is provided as the pump input to first stage 86, with a second beam $P_{1B}$ (operating at a second power level $P_{P1B}$) provided as the input source for second stage 88 (where the sum of $P_{P1A}$ and $P_{P1B}$ is ideally equal to the input power $P_{P1}$ of pump source 90).

Referring now in particular to first preamplifier stage 86, the incoming signal $S_{IN}$ and first pump beam $P_{1A}$ are provided as inputs to a first WDM 94, which directs both beams along a common output fiber, which in this case is a first section of single-clad Ho-doped gain fiber 96 (having a length $L_1$). The output from first preamplifier stage 86, designated $S_{A1A}$, is then provided as an input (amplified) signal to second preamplifier stage 88. As shown, a second WDM 98 is disposed to receive this amplified signal $S_{A1A}$, as well as the larger portion ($P_{1B}$) of the pump beam. The combination of these two lightwaves is then coupled into a second section of single-clad Ho-doped gain fiber 100 (having a length $L_2$), creating the preamplifier output $S_{A1B}$.

Turning now to TDFA 84 of hybrid fiber amplifier 80, the amplified output $S_{A1B}$ from preamplifier 82, and a second pump beam P2 from pump source 102 is coupled into the Tm-doped core region of single-clad gain fiber 104 via a WDM 106. The combination of the pump beam and signal within Tm-doped gain fiber 104 provides the final amplified output signal from fiber amplifier 80, denoted as amplified output signal $S_{OUT}$ in FIG. 15.

Figure 16:
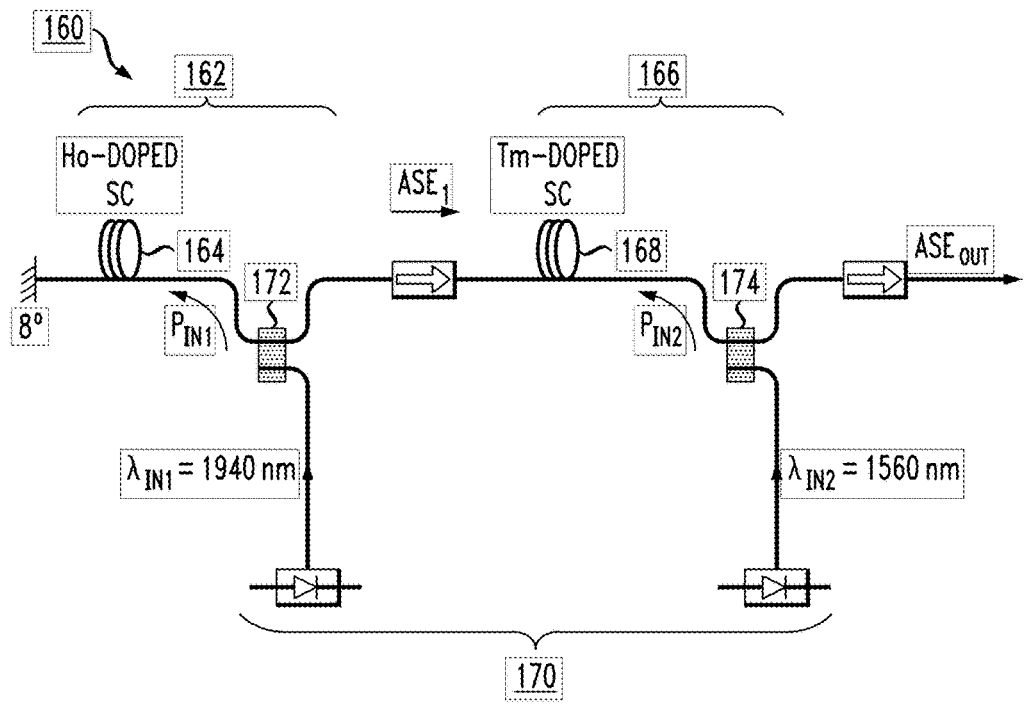
FIG. 16 illustrates an exemplary ASE source created by using the hybrid amplifier arrangement of the present invention, the ASE source operating without an input optical signal and generating ASE output by virtue of the presence of the pump beams within the amplifier elements.

In another application, the inventive hybrid HDFA/TDFA may be used to generate an ASE optical beam. There are applications where there is a need to provide a broadband "noise" signal with a relatively high level of optical power (for example, as an input seed source for fiber optic gyroscopes). FIG. 16 illustrates an exemplary ASE source 160 formed in accordance with the present invention to provide this broadband ASE output. In contrast to the arrangements described above that are specifically directed to the amplification of an applied input signal, ASE source 160 provides a broadband continuum output associated with the propagation of only pump light through the sections of Ho-doped gain fiber and Tm-doped gain fiber.

ASE source 160 is shown as including a first stage 162 based upon the use of a section of single-clad, Ho-doped optical fiber 164. A second stage 166 is based upon the use of a section of single-clad, Tm-doped optical fiber 168. A pump source 170, which may utilize separate, discrete devices or instead comprise an arrangement similar in form to pump source 30 described above, is used to provide pump light at wavelengths appropriate for generating spontaneous emission within each stage. That is, pump source 170 provides a first pump input $P_{IN1}$ at a wavelength $\lambda_{IN1}$ of about 1940 nm to first stage 162 via a first WDM 172, and a second pump input $P_{IN2}$ at a wavelength $\lambda_{IN2}$ of about 1560 nm to second stage 166 via a second WDM 174. In this particular configuration, both pump beams are applied in the "counter-propagating" direction with respect to the ASE output.

Also included in ASE 160 is a reflective termination 176 disposed at the input of single-clad Ho-doped gain fiber 164 of HDFA 162. Reflective termination 176 may be formed as a beveled endface of gain fiber 164 (with a bevel angle of 8°, for example). It is clear that this reflective termination substitutes for the application of an input signal in the case of a hybrid amplifier. Therefore, when used to provide a source of ASE output, pump beam $P_{IN1}$ will propagate in the reverse direction along gain fiber 164, then exit through termination 176 without reflection. Similarly, backward-propagating ASE will exit through termination 176 without reflection. In this manner, both the counter-propagating pump and ASE energy will have no additional effect on the forward-propagating ASE output spectrum. Alternatively, termination 176 may be spliced to an optical isolator (not shown), allowing for the forward ASE light of first stage 162 to be available as an additional broadband source as well.

In a similar manner, ASE output from first stage 162 is thereafter passed through single-clad Tm-doped gain fiber 168 of second stage 166, with the additional amplification thus forming the final ASE output. Included with second stage 166 is an FBG 178, positioned at the input to gain fiber 168 and configured to have a center wavelength value of $\lambda_{IN2}$. Thus, second pump beam $P_{IN2}$ will interact with FBG 178 in a manner that re-directs any remaining pump energy to pass a second time through gain fiber 168 and increase the amount of output power present in the output. While not rising to the amplified level of an input signal, this pump light is also sufficiently amplified, providing the relatively broadband ASE output as shown in FIG. 17.

Figure 17:
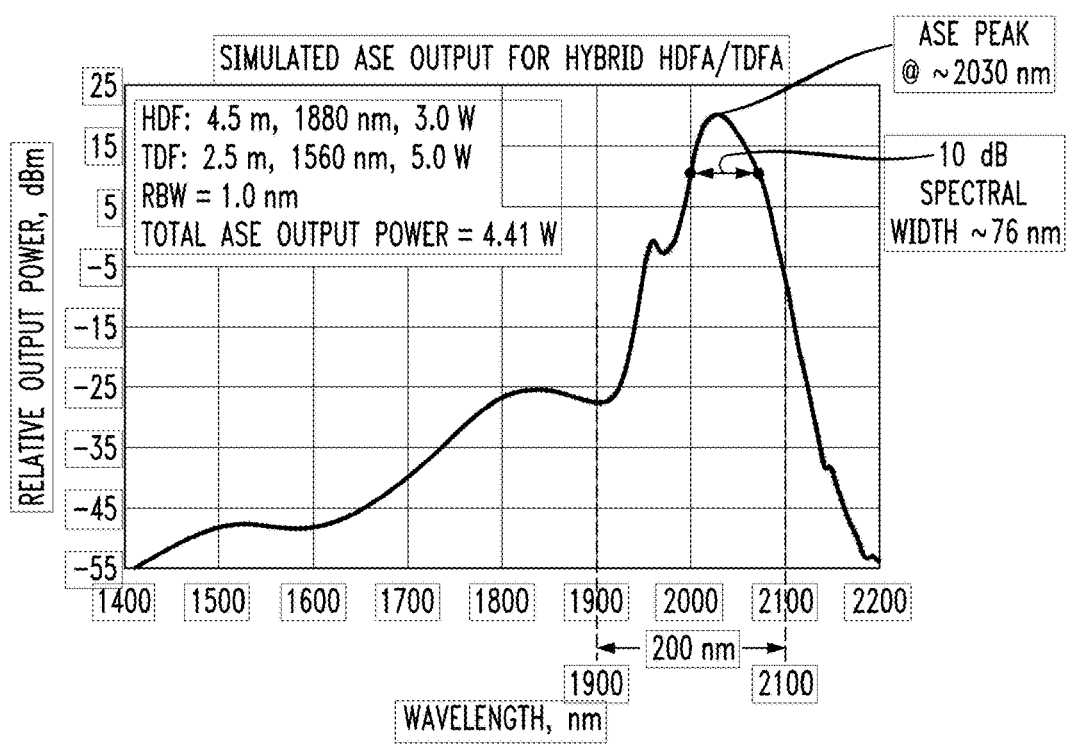
FIG. 17 contains a plot of a simulated ASE broadband spectrum created from a hybrid fiber amplifier formed in accordance with the present invention.

In particular, the simulation shown in FIG. 17 is for a configuration where first stage 162 is counter-pumped with a pump beam P1 operating at a wavelength $\lambda_{IN1}$ of 1880 nm, and having an output power of about 3 W. Second stage 166 was also counter-pumped with this simulation, using a 5 W pump beam P2 at a wavelength $\lambda_{IN2}$ of 1560 nm. Over 99% of the broadband output shown in FIG. 17 resides within the wavelength region of 1900-2200 nm, with a 10 dB spectral width spanning a 76 nm band from 2000-20076 nm.

Figure 18:
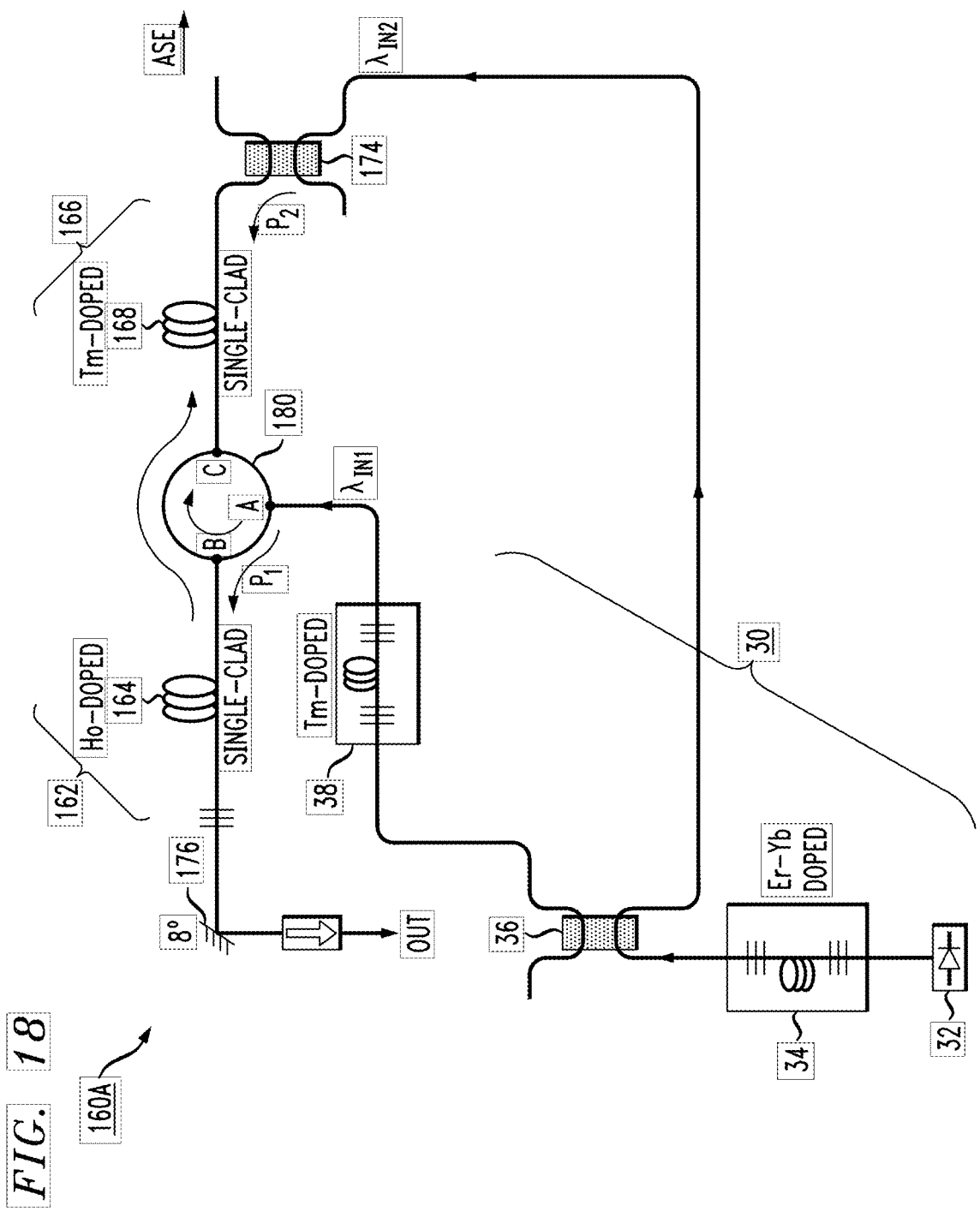
FIG. 18 shows an alternative embodiment of an ASE source, based upon the use of an optical circulator in place of a WDM to provide coupling of the pump beam into the single-clad Ho-doped fiber of the first stage.

FIG. 18 illustrates an alternative embodiment of an ASE source formed in accordance with the principles of the present invention. In particular, ASE source 160A is based upon the use of an optical circulator 180 in combination with single-clad Ho-doped single clad gain fiber 164. Similar to the arrangements using optical circulators as described above, pump light at $\lambda_{IN1}$ is applied as an input to port A of optical circulator 180. The pump light exits optical circulator 180 at port B and is introduced into the output of gain fiber 164, propagating in the counter direction along the fiber. The pump light will be reflected at element 176, pass again through gain fiber 164 (where it receives additional spectral broadening and amplification), and then be injected into port B of optical circulator 100. Again, the ASE generated by gain fiber 164 will travel through optical circulator 180 and ultimately exit the device at port C. This amplified pump light then passes through second stage 166 in the same manner as described above to generate the ASE output from source 160A. In this particular arrangement, pump source 30, as discussed above, is used to provide the pump beams at $\lambda_{IN1}$ and $\lambda_{IN2}$.

While certain preferred embodiments of the present invention have been illustrated and described in detail, it should be apparent that modifications and adaptations to those embodiments may occur to one skilled in the art without departing from the scope of the present invention as set forth in the claims appended hereto. Indeed, the described embodiments are to be considered in all respects as only illustrative and not restrictive.

What is claimed is:

1. A hybrid optical amplifier for operation within an eye-safe wavelength region from about 1900 nm to about 2200 nm, comprising:
    a preamplifier element formed of a section of single-clad Ho-doped optical fiber, the preamplifier responsive to an input signal propagating at a wavelength λs within the eye-safe wavelength region, the section of single-clad Ho-doped optical fiber providing gain to the input signal in the presence of a first pump beam operating at a first pump wavelength $\lambda_{P1}$ suitable to provide amplification within the section of single-clad Ho-doped optical fiber for a defined transmission bandwidth within the eye-safe wavelength region;
    a power amplifier element disposed at the output of the preamplifier element and formed of a section of single-clad Tm-doped optical fiber, the power amplifier providing gain to the output of the preamplifier element in the presence of a second pump beam operating at a second pump wavelength $\lambda_{P2}$ suitable to provide amplification within the single-clad Tm-doped optical fiber; and
    a pump supply coupled to both the preamplifier element and the power amplifier element for providing the first pump beam at $\lambda_{P1}$ as an input to the preamplifier element, and the second pump beam at $\lambda_{P2}$ as an input to the power amplifier element.

2. The hybrid optical amplifier as defined in claim 1 wherein the amplifier further comprises
    an optical passband filter disposed between the output of the preamplifier element and the input of the power amplifier element, the optical passband filter configured to prevent wavelength components outside of the defined transmission bandwidth from entering the power amplifier element.

3. The hybrid optical amplifier as defined in claim 1 wherein the pump supply comprises
    a first pump source for providing the first pump beam at $\lambda_{P1}$ to the preamplifier element; and
    a second pump source for providing the second pump beam at $\lambda_{P2}$ to the power amplifier element.

4. The hybrid optical amplifier as defined in claim 3 wherein at least one of the first and second pump sources comprises a discrete laser component operating at the associated pump wavelength.

5. The hybrid optical amplifier as defined in claim 3 wherein at least one of the first and second pump sources comprises a combination of an uncooled laser diode and a fiber laser, the uncooled laser diode operating at a defined wavelength $\lambda_{LD}$ and the fiber laser including a rare-earth dopant and configured to convert the output of the uncooled laser diode into a selected one of the first and second pump wavelengths $\lambda_{P1}$, $\lambda_{P2}$.

6. The hybrid optical amplifier as defined in claim 1 wherein the pump supply comprises
    a pump light source; and
    an optical power splitter responsive to the pump light source for direction a first portion of the pump light into the preamplifier element and a second portion of the pump light into the power amplifier element.

7. The hybrid optical amplifier as defined in claim 6 wherein the hybrid optical amplifier uses an in-band pump beam operating at a common wavelength $\lambda_{CP}$ capable of providing amplification within the section of single-clad Ho-doped fiber and the section of single-clad Tm-doped fiber, $\lambda_{CP}=\lambda_{P1}=\lambda_{P2}$, the pump light source providing an output at the common wavelength $\lambda_{CP}$.

8. The hybrid optical amplifier as defined in claim 6 wherein
    the pump light source comprises
        an uncooled laser diode operating at an input wavelength $\lambda_{LD}$; and
        a first fiber laser coupled to the uncooled laser diode, the first fiber laser configured to generate as an output either one of the first pump beam at $\lambda_{P1}$ and the second pump beam at $\lambda_{P2}$, wherein the optical power splitter directs a first portion of the output of the first fiber laser along a first path toward the preamplifier element and a second portion of the output of the first fiber laser along a second path toward the power amplifier element; and the pump supply further comprises a second fiber laser disposed along one of the first and second output paths from the optical power splitter, the second fiber laser configured to convert the incoming pump beam at one of the first and second pump wavelengths to a pump beam at a remaining one of the first and second pump wavelengths.

9. The hybrid optical amplifier as defined in claim 8 wherein the pump light source comprises an uncooled laser diode operating at a wavelength $\lambda_{LD}$ of 940 nm and an Er—Yb co-doped fiber laser configured to convert the wavelength $\lambda_{LD}$ to the second pump beam wavelength $\lambda_{P2}$; and the second fiber laser comprises a Tm-doped fiber laser disposed between the optical power splitter and the preamplifier element, the second fiber laser configured to convert the second pump beam wavelength $\lambda_{P2}$ to the first pump beam wavelength $\lambda_{P1}$.

10. The hybrid optical amplifier as defined in claim 1 wherein the power amplifier element section of single-clad Tm-doped optical fiber further comprises Ho dopant, forming an Ho—Tm co-doped optical gain fiber responsive to residual pump energy from the first pump beam and pump energy from the second pump beam.

11. The hybrid optical amplifier as defined in claim 1 wherein the preamplifier element and the power amplifier element comprise polarization-maintaining single-clad optical fiber.

12. The hybrid optical amplifier as defined in claim 1 wherein the input signal comprises a CW signal, operating at a single frequency.

13. The hybrid optical amplifier as defined in claim 1 wherein the input signal comprises a pulsed optical signal.

14. The hybrid optical amplifier as defined in claim 1 wherein the preamplifier element is configured as a co-propagating optical amplifier and further comprises a wavelength division multiplexer (WDM) disposed at an input of the section of single-clad Ho-doped optical fiber, the WDM responsive to an input signal $S_{IN}$ operating at an eye-safe wavelength $\lambda_s$ and the first pump beam operating at the first pump wavelength $\lambda_{P1}$, coupling both inputs into the Ho-doped core of the single-clad optical fiber.

15. The hybrid optical amplifier as defined in claim 1 wherein the preamplifier element is configured as a counter-propagating optical amplifier and further comprises a WDM is disposed at the output of the section of single-clad Ho-doped optical fiber, the first pump beam operating at the first pump wavelength $\lambda_{P1}$ applied as an input to the WDM and directed as a first output from the WDM into an output endface of the Ho-doped core region of the single-clad optical gain fiber so as to propagate in a direction counter to an input signal $S_{IN}$.

16. The hybrid optical amplifier as defined in claim 1 wherein the preamplifier element is configured as a counter-propagating optical amplifier and further comprises an optical circulator disposed at the output of the section of single-clad Ho-doped optical fiber, the first pump beam applied as an input at a first port of the optical circulator and directed to exit at a second port of the optical circulator so as to be coupled into an output endface of the Ho-doped core region of the single-clad optical gain fiber, the amplified output from the preamplifier element entering the second port of the optical circulator and thereafter directed to exit the optical circulator and be applied as an input to the power amplifier element.

17. The hybrid optical amplifier as defined in claim 16 wherein the input optical signal is a pulsed input signal, and the hybrid optical amplifier further comprises a reflective narrowband fiber Bragg grating (FBG) coupled to a third port of the optical circulator such that the amplified pulsed output from the preamplifier element propagates through the FBG prior to exiting the optical circulator at a fourth port that is coupled to the input of the power amplifier element.

18. The hybrid optical amplifier as defined in claim 16 wherein the amplifier further comprises an optical gain shaping filter disposed between the output port of the optical circulator and the input to the power amplifier element.

19. The hybrid optical amplifier as defined in claim 1 wherein the power amplifier element is configured as a co-propagating optical amplifier and further comprises a WDM disposed at an input of the section of single-clad Tm-doped optical fiber, the WDM responsive to an amplified output signal from the preamplifier element and the second pump beam operating at the pump wavelength $\lambda_{P2}$, coupling both inputs into the Tm-doped core of the single-clad optical fiber.

20. The hybrid optical amplifier as defined in claim 1 wherein the power amplifier element is configured as a counter-propagating optical amplifier and further comprises a WDM is disposed at the output of the section of single-clad Tm-doped optical fiber, second first pump beam applied as an input to the WDM and directed as a first output from the WDM into an output endface of the Tm-doped core region of the single-clad optical gain fiber so as to propagate in a direction counter to the amplified output of the preamplifier element that is applied as an input to the single-clad Tm-doped optical fiber.

21. The hybrid optical amplifier as defined in claim 1 wherein the preamplifier element comprises a plurality of separate sections of single-clad Ho-doped optical fiber, disposed to form a multi-stage preamplifier arrangement, with a separate pump beam applied to at least two sections of the plurality of separate sections.

22. The hybrid optical amplifier as defined in claim 1 wherein the preamplifier element comprises a plurality of separate sections of single-clad Ho-doped optical fiber, disposed to form a multi-stage preamplifier arrangement, with a single pump beam applied to as an input to a first section of single-clad Ho-doped optical fiber and thereafter residual pump energy propagating along the input signal path used to provide amplification within the remaining sections of single-clad Ho-doped optical fiber.

23. An optical system for providing amplified spontaneous emission in an eye-safe wavelength band, comprising:

a first stage formed of a section of single-clad Ho-doped optical fiber which generates optical energy in the presence of a first pump beam operating at a first pump wavelength;

a second stage disposed at the output of the first stage, the second stage formed of a section of single-clad Tm-doped optical fiber which generates optical energy in the presence of a second pump beam operating at a second pump wavelength; and a pump supply coupled to both the first age and the second stage for providing the first pump beam at $\lambda_{P1}$ and the second pump beam at $\lambda_{P2}$, respectively, wherein the presence of the first and second pump beams within the first and second stages generates as an output amplified spontaneous emission (ASE) centered at a wavelength within an eye-safe wavelength region.

24. The optical system as defined in claim 23 wherein the system further comprises an optical circulator disposed between the first stage and the second stage, the first pump beam coupled to a first port of the optical circulator and directed to exit from a second port of the optical circulator so as to counter-propagate through the first stage, generating a first ASE output therefrom, wherein the first ASE output is directed into the second port of the optical circulator to propagate therealong and exit at a third port of the optical circulator, where the third port is coupled to an input of the second stage of the optical system; and a WDM disposed beyond the output of the second stage, the WDM receiving as an input the second pump beam so as to direct the second pump beam into an output endface of the single-clad Tm-doped optical fiber of the second stage, imparting additional optical energy to the first ASE output as it propagates through the second stage, generating the output ASE.

\* \* \* \* \*